United States Patent
Matsuoka

(10) Patent No.: US 6,694,816 B2
(45) Date of Patent: Feb. 24, 2004

(54) APPARATUS AND METHOD FOR EVALUATING ROTATIONAL ACCURACY OF ROLLING BEARING AND ROLLING BEARING EVALUATED BY THE ROTATIONAL ACCURACY EVALUATION METHOD, AND APPARATUS AND METHOD FOR RADIAL VIBRATION OF ROTATING BODY AND ROTATION UNIT WITH ROTATING BODY EVALUATED BY THE RADIAL VIBRATION EVALUATION METHOD

(75) Inventor: Katsutoshi Matsuoka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/003,414

(22) Filed: Dec. 6, 2001

(65) Prior Publication Data

US 2002/0108444 A1 Aug. 15, 2002

(30) Foreign Application Priority Data

Dec. 6, 2000 (JP) .................................... P.2000-372013
Sep. 21, 2001 (JP) .................................... P.2001-288597

(51) Int. Cl.$^7$ ............................................. G01N 29/00
(52) U.S. Cl. ............................. 73/593; 73/579; 73/599; 73/602
(58) Field of Search .......................... 73/593, 597, 599, 73/579, 600, 602, 646, 659, 660, 662

(56) References Cited

U.S. PATENT DOCUMENTS

| 4,016,436 A | * | 4/1977 | Shoh ........................ 310/322 |
| 4,034,244 A | * | 7/1977 | Asai et al. ................... 310/325 |
| 4,744,242 A | * | 5/1988 | Anderson et al. ............. 73/104 |
| 5,172,023 A | * | 12/1992 | Kawai et al. ........... 310/323.04 |
| 5,256,928 A | * | 10/1993 | Nishikura et al. ...... 310/323.11 |
| 5,420,501 A | | 5/1995 | Matsuoka ................. 324/76.2 |
| 5,438,229 A | * | 8/1995 | Ohtsuchi et al. ........ 310/316.02 |
| 5,549,000 A | * | 8/1996 | Brown et al. ................. 73/587 |
| 5,682,805 A | * | 11/1997 | Ohne .......................... 83/875 |

FOREIGN PATENT DOCUMENTS

| JP | 3-176608 | 7/1991 |
| JP | 7-103815 | 4/1995 |

OTHER PUBLICATIONS

T.A. Harris; "Vibration and Noise"; Rolling Bearing Analysis, chapter 25; pp. 919–963 (undated).

* cited by examiner

Primary Examiner—Hezron Williams
Assistant Examiner—Jacques Saint-Surin
(74) Attorney, Agent, or Firm—Sughrue Mion, PLLC

(57) ABSTRACT

The x- and y-direction vibration components of radial vibration of a rotational shaft 106 obtained by measurement from x and y directions are transformed into frequency sample values $\{X_k Y_k, k=0, 1, \ldots N-1\}$ by discrete Fourier transform. RMS amplitude values $\{2^{1/2}|F_{ki}(2j\pi/M)|, j=0, 1, \ldots M/2-1\}$ are calculated at azimuths $\{\theta_j=2j\pi/M, j=0, 1, \ldots M/2-1\}$ corresponding to 0 to $\pi$ on the basis of frequency sample values at frequency points $\{k_i, i=1, \ldots P\}$ corresponding to specific frequencies $\{fi, i=1, \ldots P\}$ of NRRO vibration components selected from the x- and y-direction frequency sample values obtained by the discrete Fourier-transform. RMS evaluation values $A_{ki}$ are selected from these RMS amplitude values.

26 Claims, 11 Drawing Sheets

FIG. 3

RESULTS:

| FREQUENCY | RMS EVALUATION VALUES OF NRRO | MAXIMUM AZIMUTH |
|---|---|---|
| $f_1$ | $A_{k1}$ | $2j_1\pi/M$ |
| $f_2$ | $A_{k2}$ | $2j_2\pi/M$ |
| ⋮ | ⋮ | ⋮ |
| $f_p$ | $A_{kp}$ | $2j_p\pi/M$ |

JUDGING PROCESS:

FIG. 5

| RESULTS: | | |
|---|---|---|
| FREQUENCY | RMS EVALUATION VALUES OF NRRO | MAXIMUM AZIMUTH |
| $f_1$ | $A_{k1}$ | $2j_1\pi/M$ OR $2j_1\pi/M + \pi/2$ |
| $f_2$ | $A_{k2}$ | $2j_2\pi/M$ OR $2j_2\pi/M + \pi/2$ |
| ⋮ | ⋮ | ⋮ |
| $f_p$ | $A_{kp}$ | $2j_p\pi/M$ OR $2j_p\pi/M + \pi/2$ |

JUDGING PROCESS:

FIG. 7

RESULTS:

| FREQUENCY | RMS EVALUATION VALUES OF NRRO | MAXIMUM AZIMUTH |
|---|---|---|
| $f_1$ | $A_{k1}$ | $\theta_1, \theta_1 + \pi$ |
| $f_2$ | $A_{k2}$ | $\theta_2, \theta_2 + \pi$ |
| ⋮ | ⋮ | ⋮ |
| $f_p$ | $A_{kp}$ | $\theta_p, \theta_p + \pi$ |

JUDGING PROCESS:

APPARATUS AND METHOD FOR EVALUATING ROTATIONAL ACCURACY OF ROLLING BEARING AND ROLLING BEARING EVALUATED BY THE ROTATIONAL ACCURACY EVALUATION METHOD, AND APPARATUS AND METHOD FOR RADIAL VIBRATION OF ROTATING BODY AND ROTATION UNIT WITH ROTATING BODY EVALUATED BY THE RADIAL VIBRATION EVALUATION METHOD

BACKGROUND OF THE INVENTION

1. Field of the Invention

The present invention relates to an apparatus and a method for evaluating a radial vibration of a rotating body and a rotation unit with the rotating body evaluated by the radial vibration evaluation method, and an apparatus and a method for evaluating a rotational accuracy of a rolling bearing and the rolling bearing evaluated by the rotational accuracy evaluation method, in which the radial vibration asynchronous with the rotational speed of the rotating body for example non repeatable round out of such as a bearing or a spindle with a bearing incorporated therein is evaluated on the basis of frequency analysis. In particular, the present invention relates to the evaluation of a maximum (minimum) amplitude value and a maximum (minimum) azimuth of a specific frequency component of which the amplitude varies depending on a radial azimuth.

2. Description of the Related Art

A rotating body of such as rolling bearing or a spindle with a rolling bearing incorporated therein generates radial vibration due to the circularity of a bearing portion, or the like. Therefore, the rolling bearing and spindle including such a rotating body may be a vibration source generating serious vibration of a structure such as a machine tool including them.

Such a rotating body generates radial vibration also at the time of constant-speed rotation. The radial vibration contains radial vibration components asynchronous with the rotational speed of the rotating body. The asynchronous radial vibration components are called "NRRO (Non Repeatable Round Out) vibration components". The NRRO vibration component is constituted by a plurality of frequencies. The frequencies of the NRRO vibration component are determined in accordance with predetermined calculation expressions on the basis of the geometric sizes of inner and outer rings, and rolling bodies such as balls in a bearing incorporated in a rotation unit, the accuracy of form thereof and the constant-speed rotational speed of the rotating body. For the NRRO vibration components constituted by the plurality of frequencies, it is known that there is the NRRO vibration component constituted by a part of frequencies wherein the magnitude (amplitude) of vibration changes depending on the azimuth in the direction of rotation of the rotating body (hereinafter called "depending on the azimuth").

On the other hand, particularly in a hard disk device, vibration of a disk due to vibration of a ball bearing used in a rotational shaft of the hard disk becomes a main cause of error in positioning a magnetic head. Therefore, the ball bearing needs to have strict rotational accuracy.

For the provision of such a ball bearing satisfying the rotational accuracy required for the hard disk device, it is necessary to evaluate the NRRO vibration components quantitatively to thereby remove a ball bearing having NRRO vibration components unsuitable for positioning the magnetic head. It is further necessary to mainly evaluate the NRRO vibration components constituted by frequencies (hereinafter referred to as "specific frequencies") near to the resonance frequency of the hard disk device particularly selectively to thereby remove a ball bearing which may otherwise cause resonance of the hard disk device. Here, "specific frequencies" is referred in "Vibration and Noise" that is described in PP. 919–963, Chapter 25, in "Rolling Bearing Analysis (Third Edition) " written by T. A. Harris and published by John Wiley & sons, inc. (1991), for example, $f_c$, $f_{ci}$, $Zf_c$, $Zf_{ci}$, $f_R$ defined by expressions (25.14)–(25.18) in pp. 950–951. The "specific frequency" is also described in REFERENCES 25.4 and 25.10 in pp. 962–963 of the same, that is, 25.4) O. Gustafsson, T. Tallian et al., "Final Report on the Study of Vibration Characteristics of Bearings", U.S. Navy Contract NObs-78552, U.S. Navy Index No. NE071 200 (Dec. 6, 1963) and 25.10) O. Custaisson and U. Rimrott, "Measurement of Surface Waviness of Rolling-Element Bearing Parts", SAE Paper 195C (June 1960).

Generally, the NRRO vibration components of the specific frequency includes an NRRO vibration component dependent on the azimuth and an NRRO vibration component independent of the azimuth. Both NRRO vibration components are respectively constituted by a plurality of frequencies. That is, the specific frequency of the NRRO vibration component dependent on the azimuth has a plurality of frequencies, and the specific frequency of the NRRO vibration component independent of the azimuth has a plurality of frequencies. Accordingly, for example, if a NRRO vibration component of the specific frequency depends on the azimuth, the evaluation of such NRRO vibration component is carried out in such manner that magnitude (amplitude) of the NRRO vibration component constituted by the plurality of frequencies dependent on the azimuth is measured in accordance with each azimuth over all the azimuths in the direction of rotation of the rotating body; and a maximum amplitude value and an azimuth exhibiting the maximum amplitude value are determined among the magnitudes measured for NRRO vibration component constituted by the plurality of frequencies.

As one of methods for evaluating the radial vibration of the rotating body at all azimuths in the direction of rotation of the rotating body, there is known a method in which displacement sensors such as displacement measuring units for measuring the radial vibration are disposed in two places near the outer circumference of the rotating body so that the azimuths of the displacement sensors are different from each other, and radial vibration at a third azimuth different from the two azimuths is evaluated by use of vibration values measured at the two azimuths. In the method for evaluating the radial vibration, two displacement sensors are disposed so that the radial vibration may be measured in two directions (x- and y-directions) perpendicular to a rotational shaft (or rotating body) of the rotation unit and perpendicular to each other (FIG. 12). When t is the time for measuring vibration and x(t) and y(t) are measured x- and y-direction vibration components respectively, radial vibration $f(t, \theta)$ at an azimuth $\theta$ wherein $\theta$ is an angle rotated in the direction of rotation of the rotating body from the x axis on which one of the displacement sensors is disposed is given by the following expression:

$$f(t, \theta) = x(t)\cos\theta + y(t)\sin\theta$$

The amplitude of the NRRO vibration component is generally evaluated by the maximum value of the fluctuation width in the case where the NRRO vibration components are extracted every rotating period of the rotating body and superposed on each other. Here, a NRRO evaluation value means the maximum amplitude selected from the amplitudes of the NRRO vibration components at respective azimuths, and the maximum azimuth $\theta_{max}$ means an azimuth exhibiting the NRRO evaluation value.

Generally, the radial vibration $f(t, \theta)$ includes other vibration components than the NRRO vibration component dependent on the azimuth. For this reason, the amplitude of the NRRO vibration component of the specific frequency dependent on the azimuth must be selectively obtained from the radial vibration $f(t, \theta)$ by frequency analysis in order to evaluate the amplitude of the NRRO vibration component of the specific frequency dependent on the azimuth.

Generally, frequency analysis using Fourier transform is performed to selectively obtain the amplitude of the specific frequency from vibration constituted by the plurality of frequencies. In the aforementioned method of evaluating the radial vibration, in the case where radial vibration $f(t, \theta_{max})$ expressing the NRRO evaluation value and the maximum azimuth $\theta_{max}$ are obtained, even if the amplitude of the NRRO vibration component of the specific frequency dependent on the azimuth is to be evaluated by use of frequency spectra $\{F_k(\theta_{max}), k=0, 1, \ldots N-1\}$ obtained by Fourier transform of a sequence of N discrete values $\{f_n(\theta_{max})=f(n\Delta t, \theta_{max}), n=0, 1, \ldots N-1\}$ obtained by sampling the radial vibration $f(t, \theta_{max})$ by $\Delta t$, frequency spectra corresponding to the specific frequency in the frequency spectral distribution obtained by Fourier transform of the maximum azimuth $\theta_{max}$ may not be always the maximum value in all azimuths.

This is because as described above, the specific frequency is generally constituted by a plurality of frequencies, and the maximum azimuth $\theta_{max}$ is an azimuth maximizing the synthetic amplitude determined by the relative relations among frequency, amplitude and phase in each the NRRO component of specific frequency constituted by the plurality of frequencies dependent on the azimuth; however, the NRRO vibration component of each frequency generally exhibits maximum amplitude at azimuths different from one another.

For this reason, the true maximum azimuth $\theta_{max}$ in each the NRRO vibration component of the specific frequency need to be obtained as follows: a frequency spectral distribution is obtained from radial vibration $f(t, \theta)$ $\{0 \leq \theta < 2\pi\}$ at each azimuth by frequency analysis using Fourier transform; a frequency spectra corresponding to the specific frequency are obtained at each azimuth; the vibration levels of the frequency spectra are compared with one another all over the azimuths in accordance with each frequency, so that a frequency spectrum exhibiting the maximum vibration level is selected from the frequency spectra in accordance with each frequency; a frequency spectrum exhibiting the maximum vibration level is further selected from the selected frequency spectra for respective frequencies; and an azimuth exhibiting the selected frequency spectrum is obtained.

In the frequency analysis using Fourier transform at each azimuth, however, FFT (Fast Fourier Transform) operation needs to be repeated at each azimuth $\theta$ if the azimuth $\theta$ is taken finely to increase accuracy in calculation of the true maximum azimuth $\theta_{max}$. Hence, it is necessary to perform a great deal of calculation. There is a problem that NRRO vibration components of radial vibration of the rotating body in a production line cannot be evaluated in real time.

Further, when the radial vibration of the rolling bearing is observed at one point on a fixed ring, vibration caused by form errors in a rotating ring and rolling elements is observed equally in any position on the fixed ring. It is however known that vibration caused by form error in the fixed ring is observed with different magnitude in accordance with a location of measurement. Such vibration cannot be evaluated correctly unless a maximum amplitude is found all over the circumference of the fixed ring. Therefore, there can be conceived of a method for finding a maximum value of a specific frequency component by repeated frequency analysis while displacing a sensor for measuring vibration in the circumferential direction relative to the bearing or spindle. However, such a mechanism is not easy, and it takes much time for measurement.

Next, for example, when an inner ring rotates if the raceway of an outer ring which is a fixed ring has very small waviness, there is generated vibration having one specific frequency corresponding to a pair of numbers (for example NZ+1 and NZ−1; where N is integer, Z is number of rolling elements) in such polygonal waviness. On the other hand, when the outer ring rotates, there is generated vibration having a pair of frequencies corresponding to the pair of numbers in such raceway waviness. At the same time, there is generated vibration having one specific frequency in accordance with a pair of numbers in the raceway waviness of the inner ring which is a fixed ring. That is, there is a case where both or one of vibration having one specific frequency and vibration having a pair of frequencies must be selected strictly as a harmful vibration component in accordance with the operating condition of the rolling bearing. To this end, a mechanism which can observe both the rotating conditions of the inner ring and the outer ring may be provided. However, such a mechanism increases both the complexity and the price of a test apparatus.

SUMMARY OF THE INVENTION

It is a first object of the present invention to provide an apparatus and a method for evaluating a radial vibration of a rotating body, in which NRRO vibration components of the radial vibration of the rotating body in a production line can be evaluated in real time without any great deal of calculation, and a rotation unit with the rotating body evaluated by the radial vibration evaluation method.

It is a second object of the present invention to provide an apparatus and a method for evaluating a rotational accuracy of a rolling bearing, in which vibration values corresponding to respective numbers in raceway waviness of a fixed ring are obtained from vibration of one specific frequency caused by a pair of numbers, and the rolling bearing evaluated by the rotational accuracy evaluation method. In order to attain the foregoing object, vibration of the bearing is observed simultaneously from two radial directions which are not opposed (that is, not at 180°). Thus, there is provided a method for calculating the vibration values from solutions of simultaneous equations using, as coefficients, vibration values of a specific frequency caused by the fixed ring obtained on the basis of frequency analysis results of the observed vibration.

It is a third object of the present invention to provide a method in which a maximum (minimum) value of vibration of a specific frequency caused by a pair of numbers in the fixed ring and a maximum (minimum) azimuth exhibiting the maximum (minimum) value of vibration are calculated on the basis of a pair of vibration values owing to the fixed ring obtained as described above.

It is a forth object of the present invention to provide a method in which a maximum (minimum) value of vibration synthesized integrally when a rotating ring is used as a fixed ring is estimated and evaluated from measurement of vibration components of a pair of frequencies caused by a pair of numbers appearing in the rotating ring.

Further, since the fixed ring is not rigid, vibration accompanied with elastic deformation of the fixed ring caused by the passage of the rolling elements is observed at a point of measurement on the circumference of the fixed ring. The frequency of the passage of the rolling elements is equal to a specific frequency caused by the form error of the fixed ring. Thus, there is a fear that a vibration component caused by the form error of the fixed ring cannot be evaluated correctly.

It is therefore a fifth object of the present invention to provide a method in which even in such a condition, the influence of the component caused by the passage of the rolling elements is eliminated by additional observation of vibration in a different, third direction, so that the vibration component of the fixed ring can be evaluated correctly.

It is a sixth object of the present invention to provide a bearing marked in a position where the vibration becomes maximal, or a position where the vibration becomes minimal which is distant by 90° from the maximum vibration position, so that a spindle or a motor the vibration of which is thus the lowest in a specific direction can be produced.

To achieve the first object of the present invention, there is provided with a method of evaluating a radial vibration of a rotating body with the amplitude changing depending on an azimuth in a direction of rotation of the rotating body. The method comprises:

measuring the radial vibration from two mutually different directions at a specific frequency asynchronous with the rotational speed of the rotating body;

transforming vibration components of the radial vibration obtained by measurement from the two directions into frequency spectra respectively by Fourier transform;

calculating the amplitude of the radial vibration in accordance with each azimuth in the direction of rotation of the rotating body on the basis of the transformed frequency spectra obtained in the two directions; and selecting and evaluating a maximum amplitude of the radial vibration and an azimuth exhibiting the maximum amplitude on the basis of calculated amplitudes of the radial vibration for azimuths.

In the method of evaluating the radial vibration of the rotating body according to the present invention, vibration components obtained by measurement from two directions are transformed into frequency spectra respectively by Fourier transform, so that the amplitude of radial vibration at the specific frequency is calculated in accordance with each azimuth on the basis of the transformed frequency spectrum obtained in the two directions. Hence, there is no necessity of performing Fourier transform in accordance with each azimuth, so that NRRO vibration components of the radial vibration of the rotating body in a production line can be evaluated in real time without any great deal of calculation.

An amplitude calculation process used in the present invention for obtaining the amplitude of the radial vibration of the rotating body at the specific frequency in accordance with an azimuth $\theta$ will be described below.

First, vibration components $x(t)$ and $y(t)$ in x and y directions are measured. A sequence of discrete values $\{x_n=x(n\Delta t), y_n=y(n\Delta t), n=0, 1, \ldots N-1\}$ sampled at N points by dividing the vibration components $x(t)$ and $y(t)$ by $\Delta t$ respectively are subjected to Fourier transform. The Fourier transform in this process is discrete Fourier transform based on FFT operation. Hence, when discrete points on a frequency axis are replaced by k, frequency spectra $\{X_k, Y_k, k=0, 1, \ldots N-1\}$ (hereinafter referred to as "frequency sample values") expressed by $X_k$ and $Y_k$ are obtained.

Then, frequency spectra $X_h$, $Y_h$ corresponding to a frequency point h corresponding to a specific frequency are selected from the frequency spectra $\{X_k, Y_k, k=0, 1, \ldots N-1\}$. A square of a frequency sample value of radial vibration $f(t, \theta)$ at an azimuth $\theta$ in accordance with the frequency point h is calculated on the basis of the selected frequency spectra $X_h$, $Y_h$.

First, as described above, the radiation vibration $f(t, \theta)$ at the azimuth $\theta$ is given by the following expression (1).

$$f(t,\theta)=x(t)\cos\theta+y(t)\sin\theta \qquad (1)$$

When both sides of this expression (1) are subjected to Fourier transform, the square $|F_h(\theta)|^2$ of the frequency sample value of the radial vibration $f(t, \theta)$ at the azimuth $\theta$ in accordance with the frequency point h is given by the following expression (2).

$$\begin{aligned}|F_h(\theta)|^2 &= |X_h\cos\theta + Y_h\sin\theta|^2 \\ &= (X_h\cos\theta + Y_h\sin\theta)(X_h^*\cos\theta + Y_h^*\sin\theta) \\ &= |X_h|^2\cos^2\theta + |Y_h|^2\sin^2\theta + (X_hY_h^* + Y_hX_h^*)\sin\theta\cos\theta \\ &= |X_h|^2\cos^2\theta + |Y_h|^2\sin^2\theta + 2\mathrm{Re}(X_hY_h^*)\sin\theta\cos\theta\end{aligned} \qquad (2)$$

In the expression (2), $|A|$ is the absolute value of a complex number, $X_h^*$ and $Y_h^*$ are conjugate to complex numbers $X_h$ and $Y_h$ respectively, and Re (B) is a real part of a complex number B.

On this occasion, if the sequence of discrete values of $x(t)$ and $y(t)$ obtained at N points is a sequence of real values, the sequence of discrete values $\{f(n\Delta t, \theta), n=0, 1, \ldots N-1\}$ of the radial vibration $f(t, \theta)$ at the azimuth $\theta$ is also a sequence of real values. Hence, a RMS (Room Mean Square) amplitude value of the frequency sample value of the radial vibration $f(t, \theta)$ at the azimuth $\theta$ at the frequency point h is $2^{1/2}|F_h(\theta)|$. On the basis of the expression (2), the RMS amplitude value of the frequency sample value of the radial vibration $f(t, \theta)$ at the azimuth 0 in accordance with the frequency point h is given by the following expression (3).

$$2^{1/2}|F_h(\theta)| = 2^{1/2}\{|X_h|^2\cos^2\theta + |Y_h|^2\sin^2\theta + 2\mathrm{Re}(X_hY_h^*)\sin\theta\cos\theta\}^{1/2} \qquad (3)$$

The RMS amplitude value of the frequency sample value of the radial vibration $f(t, \theta)$ at the azimuth $\theta$ in accordance with the frequency point h is calculated as the amplitude of the radial vibration of the rotating body at the azimuth $\theta$ at the frequency point h, and then this process is terminated.

On this occasion, the maximum RMS amplitude value selected from the RMS amplitude values of the frequency sample values of the radial vibration $f(t, \theta)$ calculated for frequency points h at all azimuths in directions of rotation of the rotating body is used as an RMS evaluation value in evaluation of NRRO vibration components, and the azimuth $\theta$ exhibiting the RMS evaluation value is used as the maximum azimuth $\theta$ max.

Preferably, the amplitude of the radial vibration may be calculated on the basis of the frequency spectra obtained in the two directions at the specific frequency at each azimuth obtained by subdividing the azimuths of from 0 to $\pi$ in the direction of rotation of the rotating body, so that the maximum amplitude may be selected from the amplitude values calculated at the respective azimuths.

When, for example, the RMS amplitude value of the frequency sample value of the radial vibration f(t, 2jπ/M) at the azimuth 2jπ/M in the case where the direction of rotation of the rotating body at the frequency point h is divided into M parts is calculated as the amplitude of the radial vibration of the rotating body at the specific frequency at the azimuth θ, the RMS amplitude value of the frequency sample value of the radial vibration f (t, 2jπ/M) at azimuth 2jπ/M at the frequency point h is given by the following expression (4).

$$2^{1/2}|F_h(2j\pi/M)| = 2^{1/2}\{|X_h|^2\cos^2(2j\pi/M) + |Y_h|^2\sin^2(2j\pi/M) + 2\mathrm{Re}(X_hY_h^*)\sin(2j\pi/M)\cos(2j\pi/M)\}^{1/2} \quad (4)$$

In the expression (4), the absolute values $|F_h(2j\pi/M)|$ of frequency sample values at azimuths 2jπ/M =0 to T are equal to the absolute values $|F_h(2j\pi/M+\pi)|$ of frequency sample values at azimuths 2(j+M/2)π/M=2jπ/M+π=π to 2π. Hence, the RMS amplitude values of frequency sample values of the radial vibration f(t, 2jπ/M) at azimuths 2jπ/M can be calculated on the basis of the azimuths 2jπ/M=0 to π. As a result, the RMS amplitude values of frequency sample values of radial vibration f(t, 2jπ/M) at azimuths 2jπ/M need not be calculated over the whole circumference in the direction of rotation of the rotating body. Hence, the time required for calculation can be shortened.

On this occasion, the maximum RMS amplitude value selected from the RMS amplitude values of frequency sample values of the radial vibration f (t, 2jπ/M) at the frequency point h calculated at azimuths 2jπ/M=0 to n in the direction of rotation of the rotating body is used as an RMS evaluation value, and an azimuth 2jπ/M exhibiting the maximum RMS evaluation value is used as the maximum azimuth $\theta_{max}$.

Preferably, the amplitude of the radial vibration may be calculated on the basis of the frequency spectra obtained in the two directions at the specific frequency at each azimuth obtained by subdividing the azimuths of from 0 to π/2 in the direction of rotation of the rotating body, so that the maximum amplitude may be selected from the amplitude values calculated at the respective azimuths.

When, for example, cos(2jπ/M) and sin(2jπ/M) in the expression (4) are replaced by −sin(2jπ/M) and cos(2jπ/M) respectively, the RMS amplitude value at an azimuth (2jπ/M+π/2) larger by π/2 than the azimuth 2jπ/M is given by the following expression (5).

$$2^{1/2}|F_h(2j\pi/M + \pi/2)| = 2^{1/2}\{|X_h|^2\sin^2(2j\pi/M) + |Y_h|^2\cos^2(2j\pi/M) - 2\mathrm{Re}(X_hY_h^*)\sin(2j\pi/M)\cos(2j\pi/M)\}^{1/2} \quad (5)$$

Accordingly, when the expressions (4) and (5) are used, the RMS amplitude values of frequency sample values of the radial vibration f(t, 2jπ/M) at the frequency point h at the azimuths 2jπ/M =0 to n can be calculated by a simple operation of calculating sin (2jπ/M) and cos (2jπ/M) at the azimuths 2jπ/M=0 to π/2. Hence, the RMS amplitude values of frequency sample values of the radial vibration f (t, 2jπ/M) at the azimuths 2jπ/M need not be calculated over the half circumference in the direction of rotation of the rotating body. Hence, the time required for calculation can be shortened more.

Preferably, the maximum amplitude of radial vibration and the azimuth exhibiting the maximum amplitude may be deduced on the basis of the frequency spectra in the two directions and the addition theorem of trigonometric functions.

A maximum amplitude deducing process used in the present invention for deducing the maximum amplitude of the radial vibration and the azimuth exhibiting the maximum amplitude on the basis of the frequency spectra in the two directions and the addition theorem of trigonometric functions will be described below.

In the maximum amplitude deducing process in the present invention, the expression (2) is expressed by the following expression (6) using $a_h=(|X_h|^2+|Y_h|^2)/2$, $b_h=(|X_h|^2-|Y_h|^2)/2$ and $c_h=(X_hY_h^*+Y_hX_h^*)/2=2\mathrm{Re}(X_hY_h^*)$.

$$|F_h(\theta)|^2 = a_h + b_h\cos2\theta + c_h\sin2\theta \quad (6)$$
$$= a_h + (b_h^2 + c_h^2)^{1/2}\cos(2\theta - \phi_h)$$

In the expression (6), $\Phi_h$ is equal to $\tan^{-1}(c_h/b_h)$. Accordingly, from the expression (6), the maximum azimuth Oman for maximizing the square $|F_h(\theta)|^2$ of the frequency sample value is given by the following expression (7).

$$\theta_{\max} = \phi_h/2 \quad (7)$$
$$= [\tan^{-1}[2\mathrm{Re}(X_hY_h^*)/(|X_h|^2 - |Y_h|^2)]]/2 \text{ and}$$
$$\theta_{\max} = \phi_h/2 \pm \pi$$

Further, the maximum value of the square $|F_h(\theta)|^2$ of the frequency sample value is given by the following expression (8).

$$|F_h(\phi_h/2)|^2 = a_h + (b_h^2 + c_h^2)^{1/2} \quad (8)$$
$$= (|X_h|^2 + |Y_h|^2)/2 +$$
$$\{(|X_h|^2 - |Y_h|^2)^2 + (X_hY_h^* + Y_hX_h^*)^2\}^{1/2}/2$$
$$= (|X_h|^2 + |Y_h|^2 + |X_h^2 + Y_h^2|)/2$$

On this occasion, the maximum value of 2 1/2 Fh (0) is the RMS evaluation value and is given by the following expression (9).

$$2^{1/2}|F_h(\phi_h/2)|=(|X_h|^2+|Y_h|^2+X_h^2+Y_h^2|)^{1/2} \quad (9)$$

Accordingly, when the expressions (7) and (9) are used, the maximum azimuth $f_{max}$ and the RMS evaluation value can be calculated by a simple operation of calculating $|X_h|^2$, $|Y_h|^2$, $\mathrm{Re}(X_hY_h^*)$ and $|X_h^2+Y_h^2|$ on the basis of $X_h$ and $Y_h$ whenever the RMS evaluation value is to be calculated. Hence, the RMS amplitude values at respective azimuths in the direction of rotation of the rotating body need not be calculated. Hence, the time required for calculation can be shortened extremely.

Preferably, a judgment as to the rotating performance of the rotating body is made on the basis of comparison between the maximum amplitude and a predetermined value. When, for example, the maximum amplitude exceeds a predetermined value, a decision may be made that the rotating performance of the rotating body is bad.

The judgment as to the rotating performance can be made easily because a decision is made that the rotating performance is bad when the maximum amplitude exceeds a predetermined value.

Incidentally, the use of the complex values $X_h$ and $Y_h$ may be replaced by the use of the amplitude and phase thereof.

In the method of evaluating the radial vibration of the rotating body on this occasion, it is easy to deduce expressions equivalent to the expressions (1) to (9). Hence, the description of the equivalent expressions will be omitted.

On the basis of evaluation according to the radial vibration evaluation method as described above, a fixed member of a rotation unit, such as a fixed ring of a rolling bearing, a housing of a spindle may be marked in a position of the maximum azimuth exhibiting the maximum RMS evaluation value or minimum azimuth being distant by 90° from the maximum azimuth.

To achieve the second to sixth objects of the present invention, there is provided with a method for evaluating a rotational accuracy of a rolling bearing comprising:

measuring the radial vibration of a fixed ring of the rolling bearing by use of two vibration measuring sensors disposed circumferentially with a phase $\alpha$ to thereby obtain sensor signals;

making the sensor signals discrete through an A/D converter to thereby obtain two pieces of synchronizing digital data;

Fourier-transforming the digital data to thereby obtain vibration values $F(m)$ and $F_\alpha(m)$ of an order m of angular velocity $Z\omega_c$;

obtaining unknown quantities $A_{mz-1}e^{-j\theta}$ and $A_{mz+1}e^{j\theta}$ by use of the vibration values $F(m)$ and $F_\alpha(m)$ on the basis of the following expressions (11) and (12):

$$A_{mz-1}e^{-j\theta} = \{e^{j\alpha}F(m)\}/2j \sin \alpha \qquad (11)$$

$$A_{mz+1}e^{j\theta} = \{F_\alpha(m) - e^{-j\alpha}F(m)\}/2j \sin \alpha \qquad (12)$$

(wherein m designates an order of vibration, Z designates the number of rolling elements, j designates an imaginary number such that $j^2=1$, $\omega_c$ designates an angular velocity of revolution of the rolling elements, and $\theta$ designates a center angle between an unknown reference position on the fixed ring and one of the vibration measuring sensors);

obtaining, from the unknown quantities, RMS values of vibration components caused by mZ−1 (th) polygon and mZ+1(th) polygon respectively in accordance with the following expressions (13) and (14):

$$\text{RMS value of component of } mZ-1(\text{th}) \text{ polygon} = \sqrt{2}|A_{mz-1}| = \sqrt{2}|A_{mz-1}e^{-j\theta}| \qquad (13)$$

$$\text{RMS value of component of } mZ+1(\text{th}) \text{ polygon} = \sqrt{2}|A_{mz+1}| = \sqrt{2}|A_{mz+1}e^{j\theta}| \qquad (14);$$

and evaluating the rotational accuracy of the rolling bearing on the basis of the RMS values.

The two vibration measuring sensors are disposed at two points on the fixed ring of the rolling bearing in order to observe the radial vibration. Signals from the two vibration measuring sensors are taken in a computer through the A/D converter so as to be used as two synchronizing sequences of sampled values. Vibration values (RMS values) corresponding to a pair of numbers in the shape of the fixed ring are obtained from solutions of complex simultaneous linear equations with two unknowns, using as coefficients, complex values of a desired frequency component selected from Fourier transforms of the respective sequences, and a function of an angle between the positions where the vibration measuring sensors are disposed.

The sum of absolute values of these two vibration values (or the difference therebetween) is set to a maximum (minimum) value of vibration depending on the shape of the fixed ring.

On the other hand, from the complex values of the desired frequency component selected from the respective Fourier transforms, and the angle between the positions where the two sensors are disposed, the azimuth in which vibration becomes maximal (minimal) is calculated as a relative angle with respect to each of the two sensors. Since the maximum vibration values and the azimuths exhibiting the maximum vibration values are known thus, the rotational accuracy of the rolling bearing can be evaluated by comparing the maximum vibration values and their azimuths with threshold values.

Incidentally, a maximum amplitude value and a minimum amplitude value of angular velocity $mZ\omega_c$ are expressed by the following expressions (15) and (16):

$$\text{maximum RIMS value} = \sqrt{2}(|A_{mz-1}|+|A_{mz+1}|) \qquad (15)$$

$$\text{minimum RMS value} = \sqrt{2}||A_{mz-1}|-|A_{mz+1}|| \qquad (16)$$

Further, phases of the maximum amplitude value and the minimum amplitude value of the angular velocity $mZ\omega_c$ are:

maximal at $\gamma_o$ and $\gamma_o+\pi$ and minimal at $\gamma_o\pm\pi/2$ if $|\gamma_o|\leq\pi/4$, and minimal at $\gamma_o$ and $\gamma_o+\pi$ and maximal at $\gamma_o\pm\pi/2$ if $\pi/4<|\gamma_o|\leq\pi/2$, respectively when $|F(m)|^2 \cos 2\alpha + |F_\alpha(m)|^2 - \{F(m)F^*_\alpha(m)+F^*(m)F_\alpha(m)\}\cos \alpha \leq 0$; and minimal at $\gamma_o$ and $\gamma_o+\pi$ and maximal at $\gamma_o\pm\pi/2$ if $|\gamma_o|\leq\pi/4$, and maximal at $\gamma_o$ and $\gamma_o+\pi$ and minimal at $\gamma_o+\pi/2$ if $\pi/4<|\gamma_o|\leq\pi/2$, respectively, when $|F(m)|^2\cos 2\alpha + |F_\alpha(m)|^2 - \{F(m)F^*_\alpha(m)+F^*(m)F_\alpha(m)\}\cos \alpha > 0$ (providing $2\gamma_o$ is given by expression (46) as described below). Incidentally, $F^*(m)$ used in the specification (including the scope of claim for a patent) is assumed to be conjugate to $F(m)$.

Further, in accordance with expression (49) as described below, by use of the vibration values of the fixed ring, RMS values of vibration components caused by mZ−1 (th) polygon and m mZ+1 (th) polygon respectively when a rotating ring and the fixed ring are used reversely are set as:

$$\text{RMS value of component of } mZ-1(\text{th}) \text{ polygon} = \sqrt{2}|B_{mz-1}| \qquad (17)$$

$$\text{RMS value of component of } mZ+1(\text{th}) \text{ polygon} = \sqrt{2}|B_{mz+1}| \qquad (18);$$

and a maximum amplitude value and a minimum amplitude value of angular velocity $mZ\omega_c$ are set as:

$$\text{maximum RMS value} = \sqrt{2}(|B_{mz-1}|+|B_{mz+1}|) \qquad (19)$$

$$\text{minimum RMS value} = \sqrt{2}||B_{mz-1}|-|B_{mz+1}|| \qquad (20)$$

That is, the sum of the absolute values (or the difference therebetween) of the pair of vibration values corresponding to a pair of numbers of pairs in the rotating ring selected from at least one of the above-mentioned Fourier transforms provides a maximum (minimum) value of vibration of the above-mentioned one specific frequency when the rotating ring is regarded as a fixed ring.

Further, another vibration measuring sensor is provided at a phase $\beta$, and in accordance with expressions (50) to (54) as described below, RMS values of vibration components caused by mZ−1(th) polygon and mZ+1(th) polygon respectively are set as:

$$\text{RMS value of component of } mZ-1(\text{th}) \text{ polygon} = \sqrt{2}|A_{mz+1}| \qquad (21)$$

$$\text{RMS value of component of } mZ+1(\text{th}) \text{ polygon} = \sqrt{2}|A_{mz+1}| \qquad (22);$$

and a maximum amplitude value and a minimum amplitude value of angular velocity $mZ\omega_c$ are set as:

$$\text{maximum RMS value} = \sqrt{2}(A_{mz-1}| + |A_{mz+1}|) \quad (23)$$

$$\text{minimum RMS value} = \sqrt{2}||A_{mz-1}| - |A_{mz+1}|| \quad (24)$$

That is, when the third vibration measuring sensor is disposed, in the same manner as and at the same time that the signals from the two vibration measuring sensors, a signal from the third vibration measuring sensor is taken in a computer through the A/D converter, so that the three signals are used as three synchronizing sequences of sampled values. Vibration values corresponding to a pair of numbers of pairs in the shape of the fixed ring and an vibration value corresponding to the elastic deformation of the fixed ring accompanied with the passage of the rolling elements are obtained from solutions of complex simultaneous linear equations with three unknowns, using, as coefficients, complex values of a desired frequency component selected from Fourier transforms of the three sequences, and a function of angles among the three vibration measuring sensors. The fixed ring is thus evaluated in the same manner as described above.

In a similar manner, when $F(m) = F'(m) - D_{mz}e^{-jmz\theta}$ and $F_\alpha(m)$ $F = _\alpha'(m) - D_{mz}e^{-jmz(\theta+\alpha)}$ are set, phases of the maximum amplitude value and the minimum amplitude value of the angular velocity $mZ\omega_c$ are:

maximal at $\gamma_o$ and $\gamma_o + \pi$ and minimal at $\gamma_o + \pi/2$ if $|\gamma_o| \leq \pi/4$, and minimal at $\gamma_o$ and $\gamma_o + \pi$ and maximal at $\gamma_o + \pi/2$ if $\pi/4 < |\gamma_o| < \pi/2$, respectively, when $IF(m)^2 \cos 2a + IFa(n)^2 \{F(m)F^*_\alpha(m) + F^*(m)F_\alpha(m)\} \cos \alpha \leq 0$; and minimal at $\gamma_o$ and $\gamma_o + \pi$ and maximal at $\gamma_o \pm \pi/2$ if $|\gamma_o| \leq \pi/4$, and maximal at $\gamma_o$ and $\gamma_o + \pi$ and minimal at $\gamma_o \pm \pi/2$ if $\pi/4 < |\gamma_o| \leq \pi/2$, respectively, when $|F(m)|^2 \cos 2\alpha + |F_\alpha(m)|^2 - \{F(m)F^*_\alpha(m) + F^*(m)F_\alpha(m)\} \cos \alpha > 0$ (providing $2\gamma_o$ is given by expression (46) as described below).

On the basis of evaluation according to the rotational accuracy evaluation method as described above, the fixed ring is marked in a position where an vibration component is maximal or minimal in the rolling bearing. Accordingly, when such a rolling bearing is installed, the direction of the bearing in which vibration is minimal is aligned with the direction of cutting with a cutting tool or grinding wheel in a processing machine. In a hard disk unit, the direction of the bearing in which vibration is minimal is aligned with the direction of movement of a head. Thus, the influence of vibration caused by the rolling bearing can be reduced.

BRIEF DESCRIPTION OF THE DRAWINGS

FIG. 3 is a table for judging the rotating performance of the rotational shaft 106 used in the maximum amplitude evaluation process shown in FIG. 2;

FIG. 5 is a table for judging the rotating performance of the rotational shaft 106 used in the maximum amplitude evaluation process shown in FIG. 4;

FIG. 7 is a table for judging the rotating performance of the rotational shaft 106 used in the maximum amplitude evaluation process shown in FIG. 6;

DETAILED DESCRIPTION OF THE INVENTION

An evaluation method according to a first embodiment of the present invention will be described below in detail with reference to the drawings.

The evaluation method according to the first embodiment of the present invention is executed by the following evaluation apparatus when radial vibration of a rotating body is measured from two mutual different directions so that the maximum amplitude of NRRO vibration components depending on azimuths and an azimuth exhibiting the maximum amplitude are evaluated on the basis of each of the measured two-direction vibration components.

The schematic configuration of the evaluation apparatus for executing the radial vibration evaluation method according to the first embodiment of the present invention will be described with reference to the drawings.

Figure 1A:
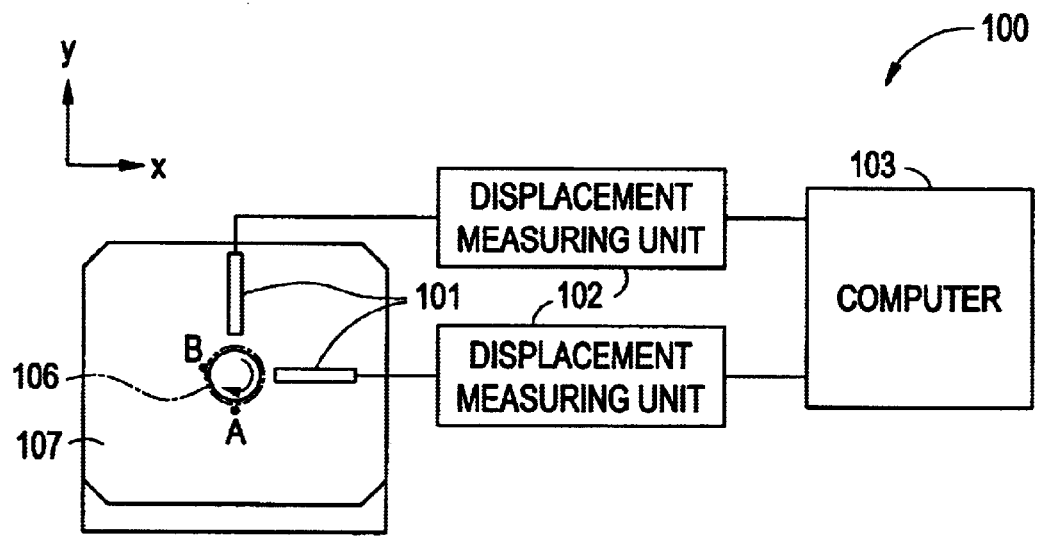
FIGS. 1A and 1B are a front view and a side view showing the schematic configuration of an evaluation apparatus for executing an radial vibration evaluation method according to a first embodiment of the present invention.
Figure 1B:
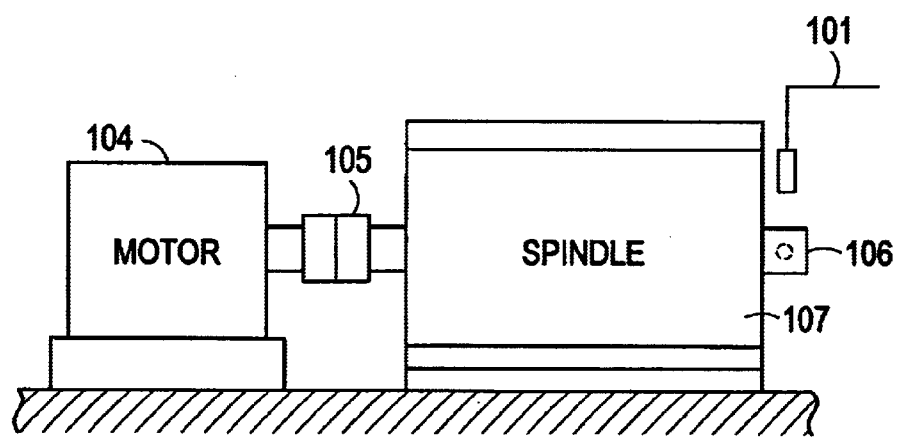

FIGS. 1A and 1B are views showing the schematic configuration of an evaluation apparatus which executes the radial vibration evaluation method according to the first embodiment of the present invention.

In FIGS. 1A and 1B, the evaluation apparatus 100 has two displacement sensors 101 of a non-contact optical type, a computer 103, a motor 104, a coupling 105, and a spindle 107 provided with a rotational shaft 106. The spindle 107 also has a balling bearing (not shown) incorporated therein.

The rotational shaft 106 is aligned so horizontally as to be protruded from a front surface of the spindle 107. The two displacement sensors 101 are disposed in a horizontal direction (x direction in FIGS. 1A and 1B) perpendicular to the rotational shaft 106 and in a vertical direction (y direction in FIGS. 1A and 1B) perpendicular to the rotational shaft 106, respectively. Hence, the two displacement sensors 101 are perpendicular to each other. The two displacement sensors are connected to the computer 103 through displacement measuring units 102 respectively (FIG. 1A). The motor 104 is provided with a rotational shaft connected to the rotational shaft 106 through the coupling 105 (FIG. 1B).

Each of the displacement sensors 101 measures a radial vibration component of the rotational shaft 106 and sends the measured vibration component as a signal to corresponding one of the displacement measuring units 102. The displacement measuring unit 102 converts the sent signal into a voltage signal proportional to the quantity of displacement of the rotational shaft 106 with respect to the x or y direction and supplies the generated voltage signal to an A/D converter (not shown but contained in the computer 103). The computer 103 converts the voltage signal given to the A/D converter into a digital value synchronously and stores the converted digital value. Further, the computer 103 deduces the maximum amplitude of NRRO vibration components depending on azimuths in the direction of rotation of the rotational shaft 106 and an azimuth exhibiting the maximum amplitude on the basis of the stored digital value and judges the rotating performance of the rotational shaft 106. The motor 104 transmits driving torque to the rotational shaft 106 through the coupling 105 to rotate the rotational shaft 106 at a constant speed.

The maximum amplitude evaluation process executed by the evaluation apparatus 100 shown in FIGS. 1A and 1B and provided H for evaluating the maximum amplitude of NRRO vibration components of the rotational shaft 106 will be described below with reference to FIG. 2.

Figure 2:
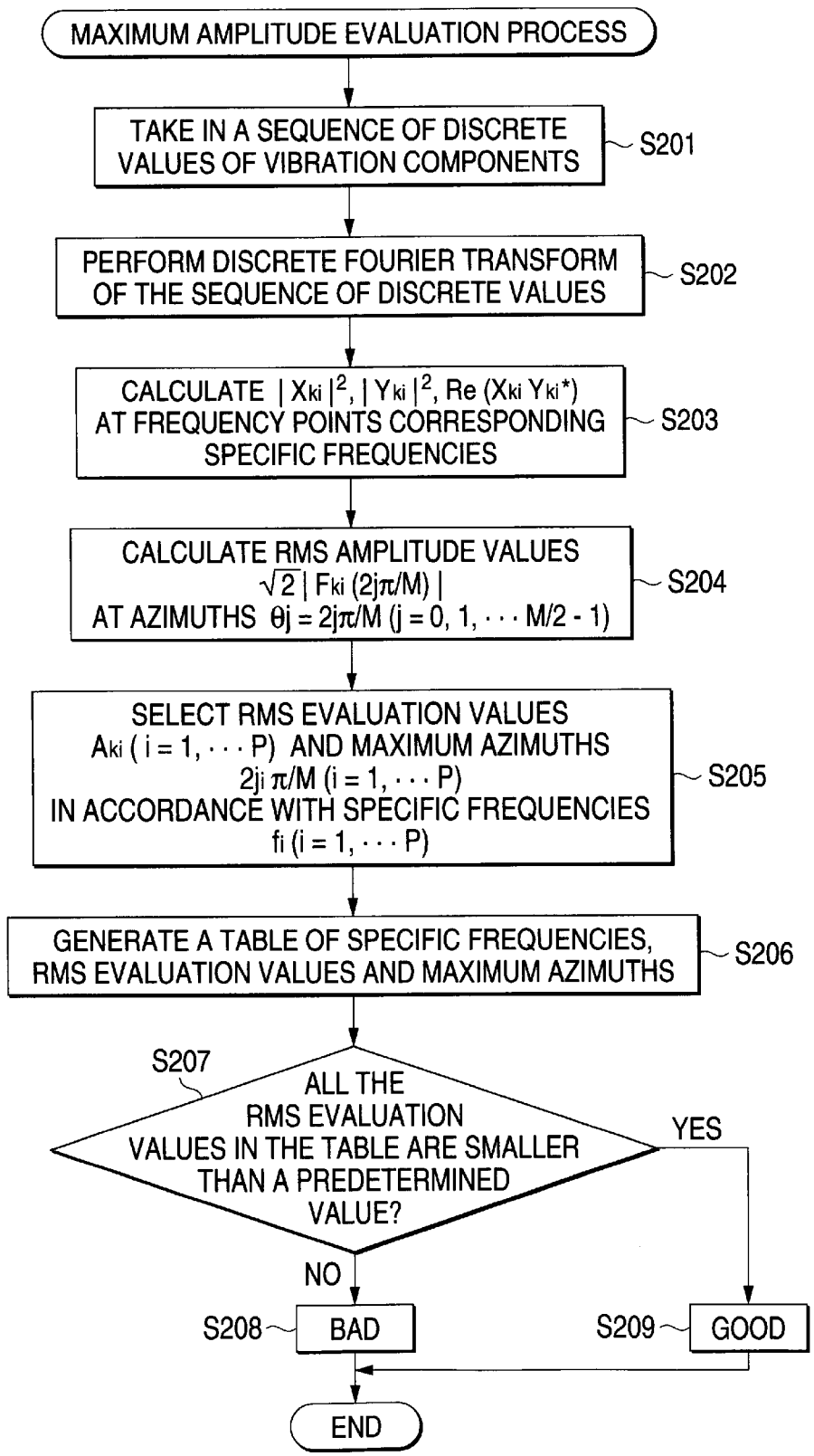
FIG. 2 is a flow chart showing a first embodiment of a maximum amplitude evaluation process executed by an evaluation apparatus 100 shown in FIGS. 1A and 1B for evaluating the maximum amplitude of NRRO vibration components of a rotational shaft 106.

FIG. 2 is a flow chart showing a first embodiment of the maximum amplitude evaluation process executed by the evaluation apparatus 100 shown in FIGS. 1A and 1B and provided for evaluating the maximum amplitude of NRRO vibration components of the rotational shaft 106.

First, a sequence of discrete values $\{x_n = x(n\Delta t), y_n = y(n\Delta t), n = 0, 1, \ldots N-1\}$ of the voltage signal $x(t)$ of x-direction vibration components and the voltage signal $y(t)$ of y-direction vibration components in the rotational shaft 106 are simultaneously taken in the A/D converter (step S201). The sequence of discrete values thus taken in are subjected to discrete Fourier transform using FFT algorithm to thereby obtain frequency sample values $\{X_k, Y_k, k=0, 1, \ldots N-1\}$ expressed by $X_k$ and $Y_k$ (step S202).

Then, frequency sample values $\{X_{ki}, Y_{ki}, i=1, \ldots P\}$ at discrete points on a frequency axis corresponding to P frequency points $\{k_i, i=1, \ldots P\}$ corresponding to P frequencies (specific frequencies) $\{f_i, i=1, \ldots P\}$ of NRRO vibration components are selected from the frequency sample values $\{X_k, Y_k, k=0, 1, \ldots N-1\}$ obtained by discrete Fourier transform. The selected frequency sample values $X_{ki}, Y_{ki}$ are used for calculating $\{|X_{ki}|^2, |Y_{ki}|^2, \text{Re}(X_{ki}Y_{ki}^*), i=1, \ldots P\}$ and storing them in a memory (not shown) (step S203).

Then, RMS amplitude values $\{2^{1/2}|F_{ki}(2j\pi/M)|, j=0, 1, \ldots M/2-1\}$ are calculated on the basis of the expression (4) in accordance with each frequency point $k_i$ at azimuths $\{\theta_j = 2j\pi/M, j=0, 1, \ldots M/2-1\}$ equivalent to $0t\ \pi$ among the azimuths obtained by dividing the direction of rotation of the rotational shaft 106 into M parts (step S204). On this occasion, RMS amplitude values at azimuths corresponding to H to $2\pi$ need not be calculated because absolute values $|F_{ki}(2j\pi/M)|$ and $|F_{ki}(2j\pi/M+\pi)|$ of frequency sample values are equal to each other as described above.

A maximum RMS amplitude value is further selected from RMS amplitude values $\{2^{1/2}|F_{ki}(2j\pi/M)|, j=0, 1, \ldots M/2-1\}$, the number of which is equal to M/2, calculated as described above. The selected maximum RMS amplitude value is used as an RMS evaluation value $A_{ki}$ at a frequency point $k_i$, and an azimuth $2j\pi/M$ or $2j\pi/M+\pi$ exhibiting this RMS evaluation value $A_{ki}$ is used as the maximum azimuth (step S205).

Then, a table shown in FIG. 3 is generated on the basis of specific frequencies $\{f_i, i=1, \ldots P\}$ of NRRO vibration components, RMS evaluation values $\{A_{ki}, i=1, \ldots P\}$ and maximum azimuths $\{2j_i\pi/M, i=1, \ldots P\}$ corresponding to the RMS evaluation values $A_{ki}$ (step S206). In the table, a judgment is made as to whether all the RMS evaluation values $A_{ki}$ are smaller than a predetermined value or not (step S207).

When a result of the judgment in the step S207 shows that even one of the RMS evaluation values $A_{ki}$ is larger than the predetermined value, a decision is made that the rotating performance of the rotational shaft 106 is bad (step S208). When all the RMS evaluation values $A_{ki}$ are smaller than the predetermined value, a decision is made that the rotating performance of the rotational shaft 106 is good (steps S209) Then, this process is terminated.

According to the first embodiment of the present invention, x- and y-direction vibration components of radial vibration of the rotational shaft 106 obtained by measurement from x and y directions are transformed into frequency sample values $\{X_k, Y_k, k=0, 1, \ldots N-1\}$ by discrete Fourier transform (step S202). RMS amplitude values $\{2^{1/2}|_{ki}(2j\pi/M)|, j=0, 1, \ldots M/2-1\}$ are calculated at azimuths $\{\theta_j 2j\pi/M, j=0, 1, \ldots M/2-1\}$ equivalent to 0 to $\pi$ on the basis of frequency sample values which are taken at frequency points $\{k_i, i=1, \ldots P\}$ corresponding to specific frequencies $\{f_i, i=1, \ldots P\}$ of NRRO vibration components and which are selected from the x- and y-direction frequency sample values obtained by discrete Fourier transform (step S204). Then, RMS evaluation value $A_{ki}$ is selected from these RMS amplitude values (step S205). Accordingly, the necessity of performing Fourier transform at all azimuths can be eliminated. Moreover, the necessity of calculating RMS amplitude values at azimuths equivalent to n to $2\pi$ can be eliminated. Thus, NRRO vibration components of radial vibration of a rotating body in a production line can be evaluated in real time without any great deal of calculation.

A radial vibration evaluation method according to a second embodiment of the present invention will be described below with reference to the drawings.

Also the evaluation method according to the second embodiment of the present invention is executed by the evaluation apparatus 100 shown in FIGS. 1A and 1B when the maximum amplitude of NRRO vibration components depending on azimuths and an azimuth exhibiting the maximum amplitude are to be evaluated.

A maximum amplitude evaluation process executed by the evaluation apparatus 100 shown in FIGS. 1A and 1B for evaluating the maximum amplitude of NRRO vibration components of the rotational shaft 106 will be described below with reference to FIG. 4.

This process is different from the maximum amplitude evaluation process shown in FIG. 2 in RMS amplitude values calculated in the step S204.

Figure 4:
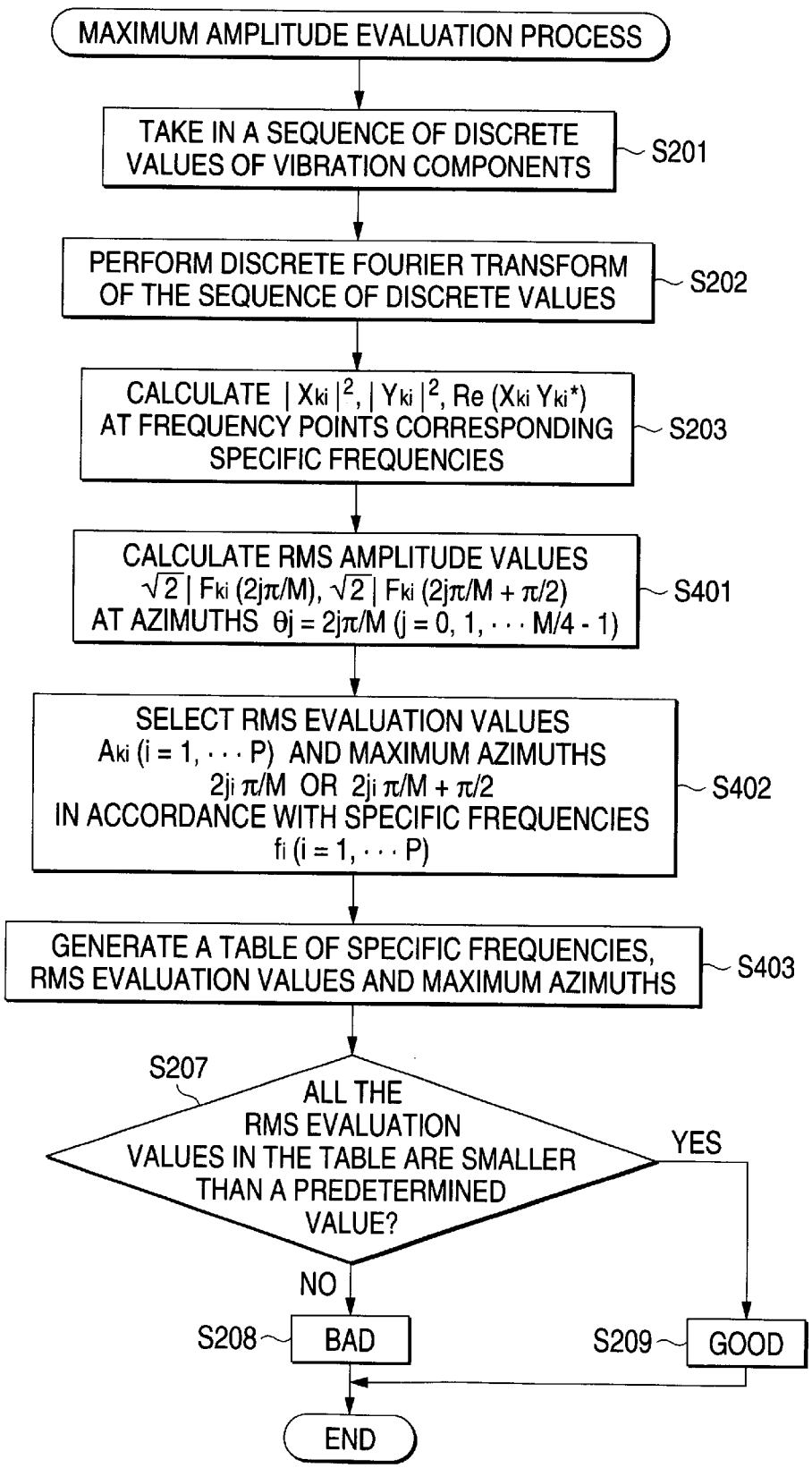
FIG. 4 is a flow chart showing a second embodiment of a maximum amplitude evaluation process executed by the evaluation apparatus 100 shown in FIGS. 1A and 1B for evaluating the maximum amplitude of NRRO vibration components of the rotational shaft 106.

FIG. 4 is a flow chart showing a second embodiment of the maximum amplitude evaluation process executed by the evaluation apparatus 100 shown in FIGS. 1A and 1B for evaluating the maximum amplitude of NRRO vibration components of the rotational shaft 106.

The steps S201 to S203 and the steps S207 to S209 in the flow chart of FIG. 4 are the same as those in the flow chart of FIG. 2. The description of these steps will be omitted.

In the process shown in FIG. 4, after the step S203, RMS amplitude values $\{2^{1/2}|F_{ki}(2j\pi/M)|, 2^{1/2}|F_{ki}(2j\pi/M+\pi/2)|, j=0, 1, \ldots M/4-1\}$ are calculated on the basis of the expressions (4) and (5) in accordance with frequency points $k_i$ at azimuths $\{\theta_j = 2j\pi/M, j=0, 1, \ldots M/4-1\}$ equivalent to 0 to $\pi/2$ among the azimuths obtained by dividing the direction of rotation of the rotational shaft 106 into M parts (steps S401).

The maximum amplitude value is further selected from the RMS amplitude values $\{2^{1/2}|F_{ki}(2j\pi/M)|, 2^{1/2}|F_{ki}(2j\pi/M+\pi/2), j=0, 1, \ldots M/4-1\}$, the number of which are equal to M/2, calculated as described above. The selected RMS amplitude value is used as an RMS evaluation value $A_{ki}$ at a frequency point $k_i$, and an azimuth $2j\pi/M$ or $2j\pi/M+\pi/2$ exhibiting this RMS evaluation value $A_{ki}$ is used as the maximum azimuth (step S402).

Then, a table shown in FIG. 5 is generated on the basis of specific frequencies $\{f_i, i=1, \ldots P\}$ of NRRO vibration components, RMS evaluation values $\{A_{ki}, i=1, \ldots P\}$ and maximum azimuths $\{2j\pi/M$ or $2j\pi/M+\pi/2, i=1, PI$ corresponding to the RMS evaluation values $A_{ki}$ (step S403). After the step S403, the step S207 and steps after the step S207 in the process shown in FIG. 2 are performed.

According to the second embodiment of the present invention, RMS amplitude values at specific frequencies $\{f_i, i=1, \ldots P\}$ of NRRO vibration components at azimuths $2j\pi/M=0$ to $\pi$ are calculated by a simple operation of calculating $\sin(2j\pi/M)$ and $\cos(2j\pi/M)$ at azimuths $2j\pi/M=0$ to $\pi/2$ (step S401). Accordingly, the necessity of calculating RMS amplitude values all over the half circumference in the direction of rotation of the rotating body can be eliminated. Hence, the time required for calculation can be shortened more greatly.

A radial vibration evaluation method according to a third embodiment of the present invention will be described below with reference to the drawings.

Also the evaluation method according to the third embodiment of the present invention is executed by the evaluation apparatus 100 shown in FIGS. 1A and 1B when the maximum amplitude of NRRO vibration components depending on azimuths and an azimuth exhibiting the maximum amplitude are to be evaluated.

A maximum amplitude evaluation process executed by the evaluation apparatus 100 shown in FIGS. 1A and 1B for evaluating the maximum amplitude of NRRO vibration components of the rotational shaft 106 will be described below with reference to FIG. 6.

This process is different from the maximum amplitude evaluation process shown in FIG. 2 in that RMS amplitude values and maximum azimuths are deduced on the basis of the addition theorem of trigonometric functions.

Figure 6:
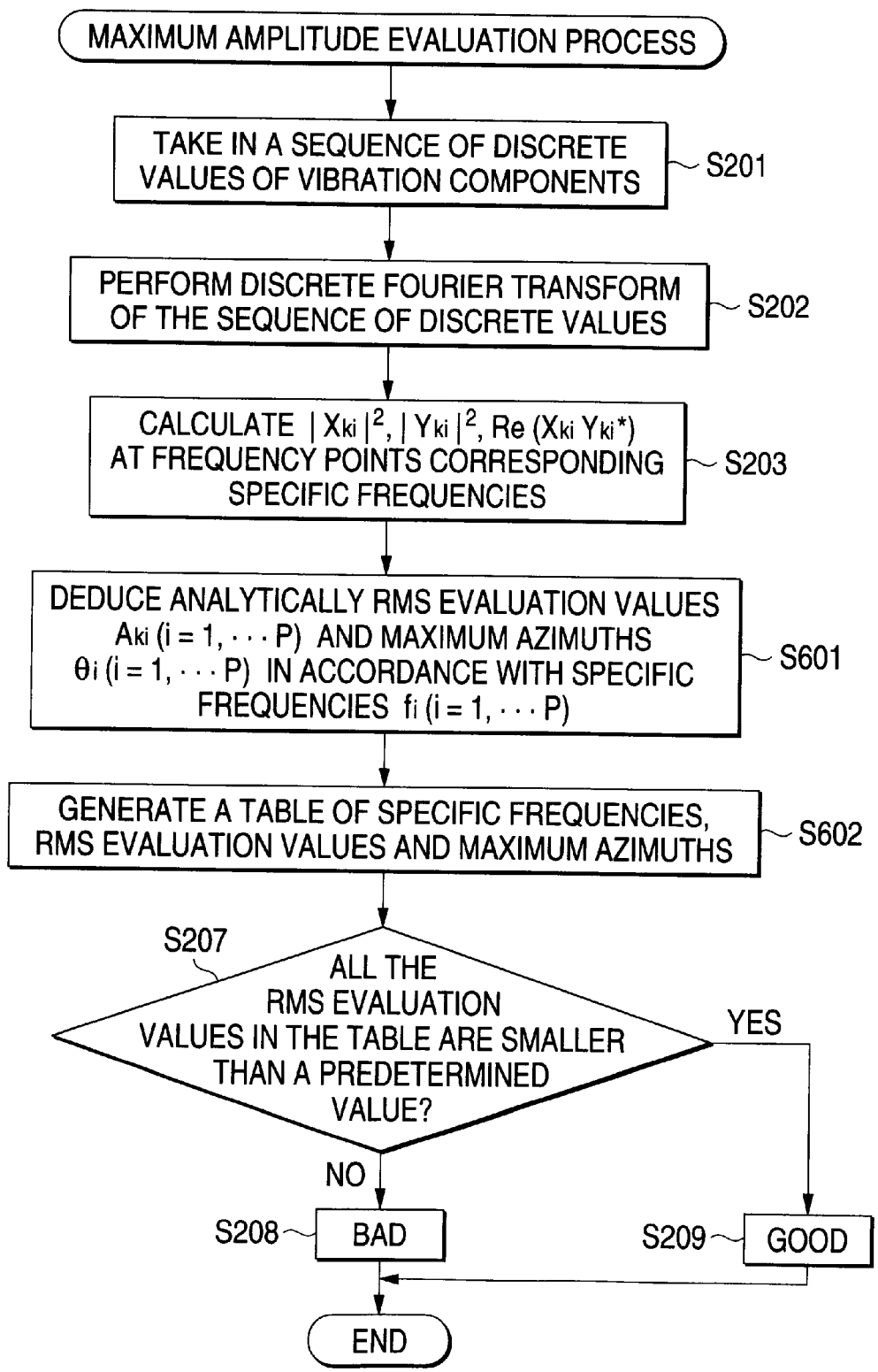
FIG. 6 is a flow chart showing a third embodiment of a maximum amplitude evaluation process executed by the evaluation apparatus 100 shown in FIGS. 1A and 1B for evaluating the maximum amplitude of NRRO vibration components of the rotational shaft 106.

FIG. 6 is a flow chart showing a third embodiment of the maximum amplitude evaluation process executed by the evaluation apparatus 100 shown in FIGS. 1A and 1B for evaluating the maximum amplitude of NRRO vibration components of the rotational shaft 106.

The steps S201 to S203 and the steps S207 to S209 in the flow chart of FIG. 6 are the same as those in the flow chart of FIG. 2. The description of these steps will be omitted.

In the process shown in FIG. 6, after the steps S203, RMS evaluation values $\{A_{ki}=2^{1/2}|F_{ki}(\Phi_{ki}/2), i=1, \ldots P\}$ are analytically deduced on the basis of the expression (9) in accordance with specific frequencies $\{f_i, i=1, \ldots P\}$ of NRRO vibration components, and maximum azimuths $(\theta_i=\Phi_{ki}/2, \theta_i+\pi, i=1, \ldots P\}$ corresponding to the RMS evaluation values $A_{ki}$ are analytically calculated on the basis of the expression (7) (step S601).

Then, a table shown in FIG. 7 is generated on the basis of specific frequencies $\{f_i, i=1, \ldots P\}$ of NRRO vibration components, RMS evaluation values $(A_{ki}, i=1, \ldots P\}$ and maximum azimuths $\{\theta_i, \theta_i+\pi, i=1, \ldots P\}$ corresponding to the RMS evaluation values $A_{ki}$ (steps S602). After the step S602, the step S207 and steps after the steps S207 in the process shown in FIG. 2 are performed.

According to the third embodiment of the present invention, RMS evaluation values $\{A_{ki}=2^{1/2}|F_{ki}(\theta_{ki}/2)|, i=1, \ldots P\}$ at specific frequencies $\{f_i, i=1, \ldots P\}$ of NRRO vibration components and maximum azimuths $\{\theta_i=\Phi_{ki}/2, \theta_i+\pi, i=1, \ldots P\}$ corresponding to the RMS evaluation values $A_{ki}$ are analytically deduced on the basis of the addition theorem of trigonometric functions (steps S601). Accordingly, the necessity of calculating RMS amplitude values at all azimuths in the direction of rotation of the rotating body can be eliminated. Hence, the time required for calculation can be shortened extremely.

A radial vibration evaluation method according to a fourth embodiment of the present invention will be described below with reference to the drawings.

Also the evaluation method according to the fourth embodiment of the present invention is executed by the evaluation apparatus 100 shown in FIGS. 1A and 1B when the maximum amplitude of NRRO vibration components depending on azimuths and an azimuth exhibiting the maximum amplitude are to be evaluated.

A maximum amplitude evaluation process executed by the evaluation apparatus 100 shown in FIGS. 1A and 1B for evaluating the maximum amplitude of NRRO vibration components of the rotational shaft 106 will be described below with reference to FIG. 8.

This process is different from the maximum amplitude evaluation process shown in FIG. 2 in that a total RMS amplitude value and a maximum azimuth at a plurality of frequencies of NRRO vibration components are deduced at one time.

Calculation expressions for deducing the total RMS evaluation value and the maximum azimuth at one time are deduced by the following procedure. First, the following expression (25) expressing power spectrum is obtained on the basis of $|X_{ki}|^2, |Y_{ki}|^2, \mathrm{Re}(X_{ki}Y_{ki}^*)$ $(i=1, \ldots P)$ and the expression (2) at discrete points given on a frequency axis in correspondence to P frequency points $\{k_i, i=1, \ldots P\}$ corresponding to specific frequencies $\{f_1, i=1, \ldots P\}$ of the calculated NRRO vibration components.

$$\sum_{i=1}^{P} |F_{ki}(\theta)|^2 = \sum_{i=1}^{P} |X_{ki}|^2 \cos^2\theta + \sum_{i=1}^{P} |Y_{ki}|^2 \sin^2\theta + 2\sum_{i=1}^{P} \mathrm{Re}(X_{ki}Y_{ki}^*)\sin\theta\cos\theta \quad (25)$$

The following expression (26) expressing the total maximum azimuth $\theta_{max}$ at the plurality of frequencies of NRRO vibration components is deduced from the expression (25) by the procedure based on the addition theorem of trigonometric functions in the same manner as the procedure of deducing the expression (7) from the expression (2).

$$\theta_{max} = \left[\tan^{-1}\left\{2\sum_{i=1}^{P} \mathrm{Re}(X_{ki}Y_{ki}^*) \bigg/ \sum_{i=1}^{P} (|X_{ki}|^2 - |Y_{ki}|^2)\right\}\right]/2 \quad (26)$$

Further, the following expression (27) expressing the total RMS evaluation value $A_{total}$ at the plurality of frequencies of NRRO vibration components is deduced from the expression (25) by the procedure based on the addition theorem of trigonometric functions in the same manner as the procedure of deducing the expression (9) from the expression (2).

$$A_{total} = \qquad (27)$$

$$|X_{ki}|^2 + |Y_{ki}|^2) + \left[\left\{\sum_{i=1}^{p} (|X_{ki}|^2 - |Y_{ki}|^2)\right\}^2 + 4\left\{\sum_{i=1}^{p} \text{Re}(X_{ki}Y_{ki}^*)\right\}^2\right]^{1/2}\right\}^{1/2}$$

Figure 8:
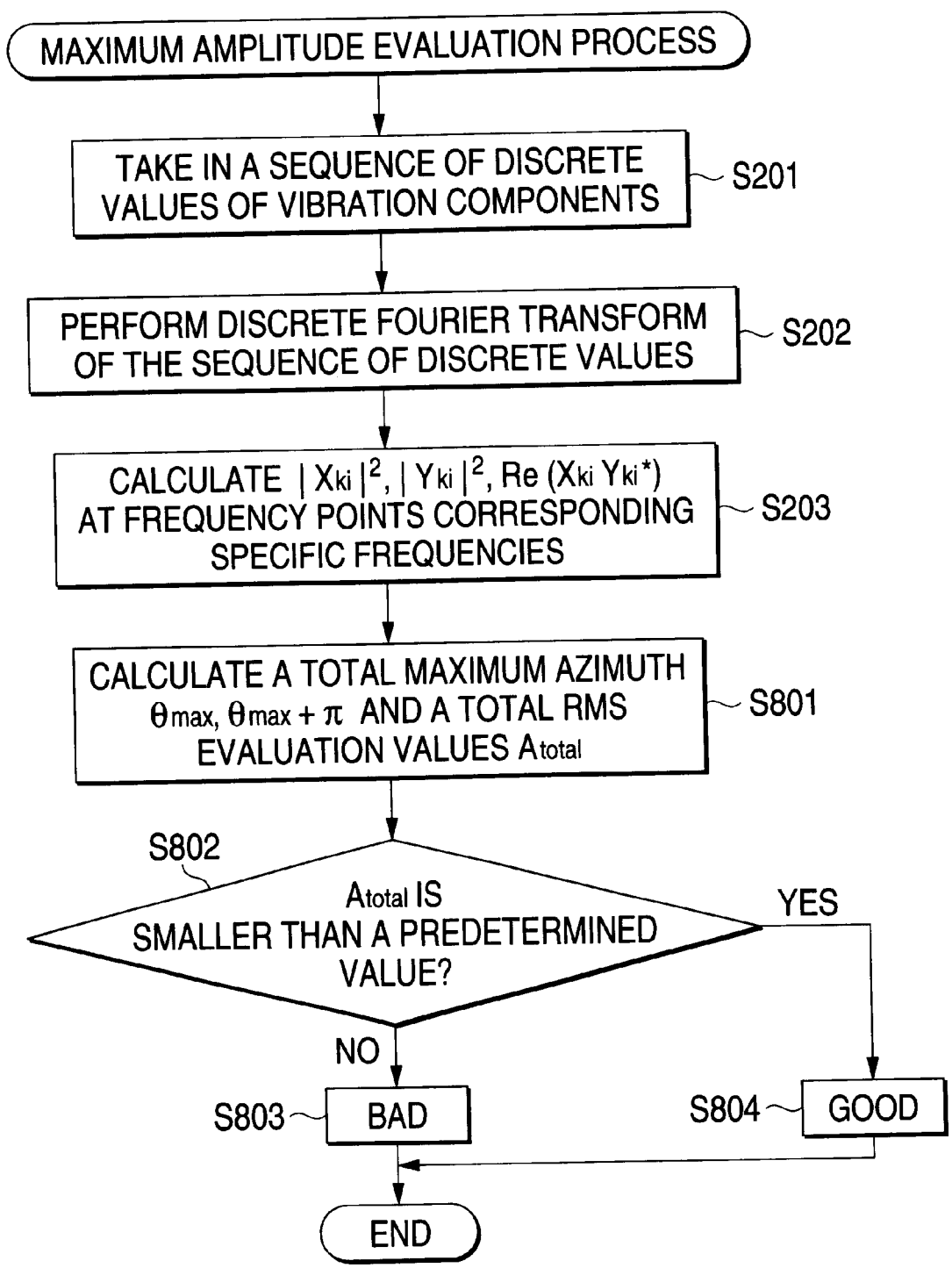
FIG. 8 is a flow chart showing a fourth embodiment a maximum amplitude evaluation process executed by the evaluation apparatus 100 shown in FIGS. 1A and 1B for evaluating the maximum amplitude of NRRO vibration components of the rotational shaft 106.

FIG. 8 is a flow chart showing a fourth embodiment of the maximum amplitude evaluation process executed by the evaluation apparatus 100 shown in FIGS. 1A and 1B for evaluating the maximum amplitude of NRRC vibration components of the rotational shaft 106.

The steps S201 to S203 in the flow chart of FIG. 8 are the same as those in the flow chart of FIG. 2. The description of these steps will be omitted.

In the process shown in FIG. 8, after the steps S203, a total maximum azimuth $\theta_{max}$ or $\theta_{max}+\pi$ and a total RMS evaluation value $A_{total}$ are calculated on the basis of $|X_{ki}|^2$, $|Y_{ki}|^2$, $\text{Re}(X_{ki}Y_{ki}^*)$ {i=1, . . . P} and the expressions (26) and (27) at discrete points given on a frequency axis corresponding to P frequency points {$k_i$, i=1, . . . P} corresponding to the specific frequencies {$f_i$, i=1, . . . P} of NRRO vibration components calculated in the steps S203(steps S801).

Then, in steps S802, a judgment is made as to whether the RMS evaluation value $A_{total}$ is smaller than a predetermined value or not.

When a result of the judgment in the steps S802 shows that the RMS evaluation values $A_{total}$ is larger than the predetermined value, a decision is made that the rotating performance of the rotational shaft 106 is bad (steps S803). When the RMS evaluation values $A_{total}$ is smaller than the predetermined value, a decision is made that the rotating performance of the rotational shaft 106 is good (steps S804). Then, this process is terminated.

Alternatively, the total RMS evaluation value and the maximum azimuth may not be deduced at one time but power spectra may be calculated on the basis of the expression (25) in accordance with azimuths {$\theta_j=2j\pi/M$, j =0, 1, . . . M/2-1} equivalent to 0 to n among the azimuths obtained by dividing the direction of rotation of the rotational shaft 106 into M parts so that the maximum value may be selected as the RMS evaluation value $A_{total}$ from the power spectra.

According to the fourth embodiment of the present invention, the total maximum azimuth $\theta_{max}$ or $\theta_{max}+\pi$ and the total RMS evaluation value $A_{total}$ at specific frequencies {$f_1$, i=1, . . . P} of NRRO vibration components are deduced at one time (steps S801). Accordingly, the whole RMS values of NRRO vibration components of the rotating body can be evaluated.

An evaluation method according to a fifth embodiment of the present invention will be described below.

Also the radial vibration evaluation method according to the fifth embodiment of the present invention is executed by the evaluation apparatus 100 shown in FIGS. 1A and 1B when the maximum amplitude of NRRO vibration components depending on azimuths and an azimuth exhibiting the maximum amplitude are to be evaluated.

The process of evaluating the maximum amplitude of NRRO vibration components in the evaluation method according to the fifth embodiment of the present invention is different from the maximum amplitude evaluation processes shown in FIGS. 2, 4, 6 and 8 in that spectral dispersion caused by leakage and disagreement in frequency points (which will be described later) is considered.

Leakage is a phenomenon which is caused by restriction of time period when vibration components to be subjected to analysis are sampled. This is the phenomenon in which the frequency spectrum of sine wave with a single frequency is dispersed to a plurality of frequency points though the spectrum must be originally a single-line spectrum. Disagreement in frequency points is disagreement between specific frequencies {$f_i$, i =1, . . . P} of NRRO vibration components and discrete frequency points {$k_1$, i =1, . . . P} of frequency sample values {$X_k$, $Y_k$, k=0, 1, . . . N-1} obtained by FFT algorithm.

The measures of the related art against spectral dispersion caused by leakage and disagreement in frequency points in this process will be described below.

First, the problems and measures of the related art against spectral dispersion caused by leakage and disagreement in frequency points have been described in detail in U.S. Pat. No. 5,420,501. According to the U.S. Pat. No. 5,420,501, a specific frequency component is evaluated in an acceptable error range when the sum of squares of frequency sample values at a plurality of frequency points near to the frequency of the vibration component to be evaluated on a frequency axis and adjacent to one another is calculated, and the root of the calculated sum of squares is multiplied by a suitable constant (for example, $2^{1/2}$ in the expressions (3), (4), (5) and (9) and a correction value against a window function such as Hanning window used).

On the other hand, x- and y-direction vibration with one frequency in a steady-state vibrating phenomenon has the property that the relation between the mutual amplitude ratio of a pair of x- and y-direction frequency sample values and the phase difference therebetween is constant in all spectra dispersed to a plurality of frequency points adjacent to one another because the correlation between the mutual amplitude ratio and the phase difference is constant on a time axis. Accordingly, the amplitude value of the frequency sample value at the same azimuth as the maximum azimuth of the frequency of the vibration components to be evaluated at each of the plurality of frequency points is always larger than that of a frequency sample value at any other azimuth.

The process according to the present invention performs evaluation of NRRO vibration components in consideration of spectral dispersion caused by leakage and disagreement in frequency points on the basis of the measures described in the U.S. Pat. No. 5,420,501 and the property of x- and y-direction vibration with one frequency in a steady-state vibrating phenomenon.

The maximum amplitude evaluation process executed by the evaluation apparatus 100 shown in FIGS. 1A and 1B for evaluating the maximum amplitude of NRRO vibration components of the rotational shaft 106 will be described below with reference to the drawings.

Figure 9:
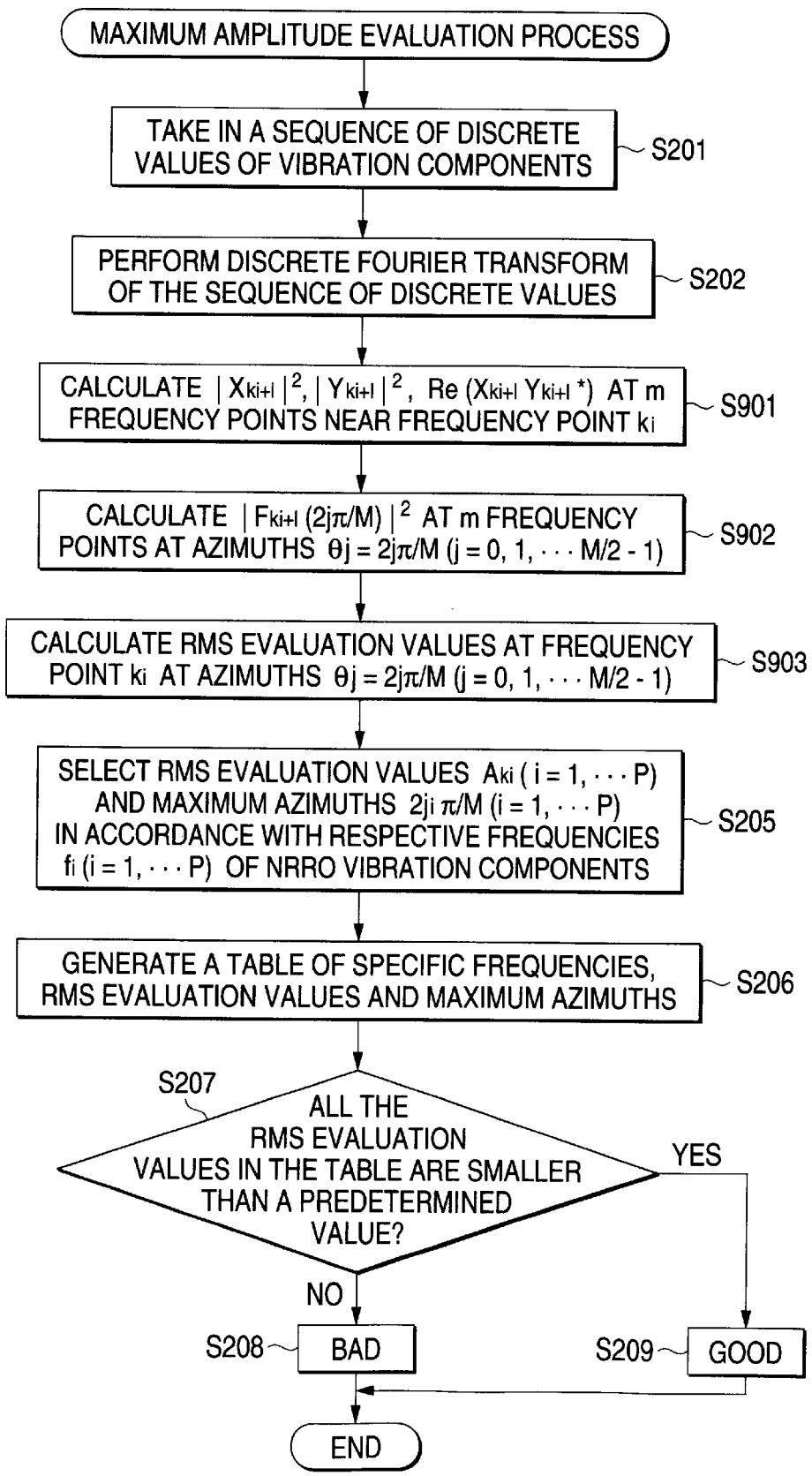
FIG. 9 is a flow chart showing a fifth embodiment of a maximum amplitude evaluation process executed by the evaluation apparatus 100 shown in FIGS. 1A and 1B for evaluating the maximum amplitude of NRRO vibration components of the rotational shaft 106.

FIG. 9 is a flow chart showing a fifth embodiment of the maximum amplitude evaluation process executed by the evaluation apparatus 100 shown in FIGS. 1A and 1B for evaluating the maximum amplitude of NRRO vibration components of the rotational shaft 106.

The steps S201 and S202 and the steps S205 to S209 in the flow chart of FIG. 9 are the same as those in the flow chart of FIG. 2. The description of these steps will be omitted.

In the process shown in FIG. 9, after the step S202, {$|X_{ki+1}|^2$, $|Y_{ki+1}|^2$, Re ($X_{ki+1}Y_{ki+1}^*$), l=-m/2, -m/2+1, . . . 0, . . . m/2-1} are calculated at m frequency points {$k_i$-m/2, $k_i$-m/2+1, . . . $k_i$, . . . $k_i$+m/2-1} which are near to a frequency k, corresponding to each specific frequency {$f_i$, i =1, . . . P} of NRRO vibration components to be evaluated and which are adjacent to one another, and the calculated results are stored in a memory not shown (step S901)

Then, squares $|F_{ki+1}(2j\pi/M)|^2$ of frequency sample values of vibration given by the following expression (28) are calculated at the m frequency points k, in accordance with azimuths $\{\theta_j=2j\pi/M, j=0, 1, \ldots M/2-1\}$ equivalent to 0 to $\pi$ among the azimuths obtained by dividing the direction of rotation of the rotational shaft 106 into M parts (steps S902).

$$|F_{ki+1}(2j\pi/M)|^2 = \qquad (28)$$
$$|X_{ki+1}|^2\cos^2(2j\pi/M) + |Y_{ki+1}|^2\sin^2(2j\pi/M) +$$
$$2\mathrm{Re}(X_{ki+1}Y_{ki+1}^*)\sin(2j\pi/M)\cos(2j\pi/M)$$

Then, the sum of the calculated squares $\{Fk_{i+1}(2j\pi/M)|^2, l=-m/2, -m/2+1, 0, \ldots m/2-1\}$ of the m frequency sample values is calculated. The root of the calculated sum is calculated. Further, the calculated root is multiplied by $2^{1/2}$ to thereby calculate an RMS amplitude value at a frequency point $k_i$ at each azimuth as given by the following expression (29) (steps S903)

$$\sqrt{2}\left(\sum_{l=-m/2}^{m/2-1}|F_{ki+l}(2j\pi/M)|^2\right)^{1/2} \qquad (29)$$

After the steps S903, the steps S205 and steps after the steps S205 in the process shown in FIG. 2 are performed.

Although the fifth embodiment has shown the case where m is tacitly an even number, it is also obvious that evaluation can be made in the same manner as described above even in the case where m is an odd number.

In the fifth embodiment, the RMS evaluation value and the maximum azimuth may be analytically deduced on the basis of the addition theorem of trigonometric functions in the same manner as the third embodiment of the present invention. A method of analytically deducing the RMS evaluation value and the maximum azimuth on the basis of the addition theorem of trigonometric functions in the fifth embodiment will be described below.

First, $\{|X_{ki+1}|^2+|Y_{ki+1}|^2, |X_{ki+1}|^2+Y_{ki+1}|^2], \mathrm{Re}(X_{ki+1}Y_{ki+1}+), l=-m/2, -m/2+1, 0, \ldots m/2-1\}$ are calculated at m frequency points $\{k_i-m/2, k_i-m/2+1, \ldots k_i, \ldots k_i+m/2-1\}$ which are near to a frequency point k, corresponding to each specific frequency $\{f_i, i=1, \ldots P\}$ of NRRO vibration components to be evaluated and which are adjacent to one another. Squares $\{Fk_{i+1}(\Phi_{ki}/2)|^2, l=-m/2, -m/2+1, \ldots 0, \ldots m/2-1\}$ of frequency sample values of vibration given by the following expression (30) are calculated at the m frequency points $\{k_i-m/2, k_i-m/2+1, \ldots k_i, \ldots k_i+m/2-1\}$ respectively.

$$|F_{ki+1}(\phi_{ki}/2)|^2=(|X_{ki+1}|^2+|Y_{ki-1}|^2+X_{ki+1}^2+Y_{ki+1}^2)/2 \qquad (30)$$

Then, the sum of the calculated squares $\{|F_{ki+1}(\Phi_{ki}/2)|^2, l=-m/2, -m/2+1, \ldots 0, \ldots m/2-1\}$ of them frequency sample values is calculated. The root of the calculated sum is calculated. The calculated root is further multiplied by $2^{1/2}$ to thereby calculate the RMS evaluation value at the frequency point $k_i$ given by the following expression (31).

$$\sqrt{2}\left(\sum_{l=-m/2}^{m/2-1}|F_{ki+l}(\phi_{ki}/2)|^2\right)^{1/2} \qquad (31)$$

Further, as described above, the relation between the mutual amplitude ratio of a pair of frequency sample values $\{X_{ki+1}, Y_{ki+1}\}$ and the phase difference therebetween is constant at any frequency point. Accordingly, the maximum azimuth giving the RMS evaluation value at the frequency point k, can be calculated by the following expression (32).

$$\theta_i = \phi_{ki}/2 \qquad (32)$$
$$= [\tan^{-1}[2\mathrm{Re}(X_{ki}Y_{ki}^*)/(|X_{ki}|^2-|Y_{ki}|^2)]]/2 \text{ and}$$
$$\theta\pi_i = \phi_{ki}/2 \pm \pi$$

According to the sixth embodiment, the spectral dispersion caused by leakage and disagreement in frequency points is considered. Accordingly, RMS evaluation values $\{A_{ki}, i=1, \ldots P\}$ corresponding to specific frequencies $\{f_i, i=1, \ldots P\}$ of NRRO vibration components can be evaluated in an acceptable error range.

In the above-mentioned embodiments of the present invention, a fixed member of a rotation unit, such as a fixed ring of a rolling bearing, a housing of a spindle may be marked in the positions of the maximum azimuth A or minimum azimuth B determined as described above, as shown in FIG. 1. Although how to mark the fixed member is not related directly to the present invention, scratching, painting, stamping, etc. can be conceived.

Figure 10:
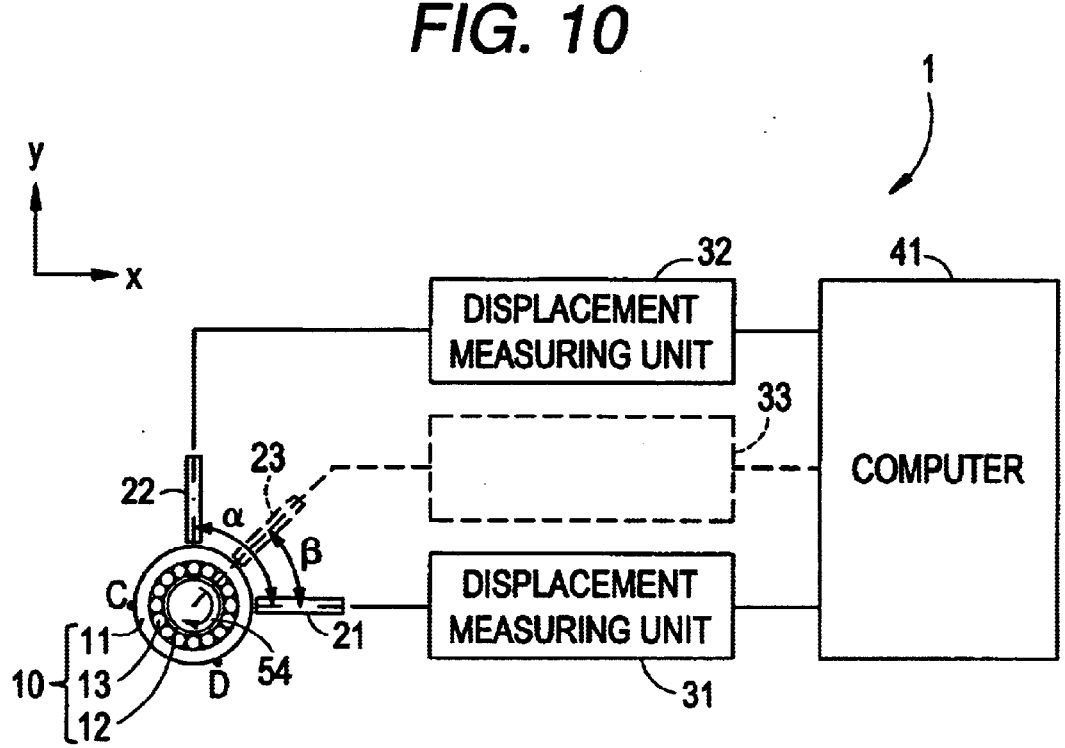
FIG. 10 is a block diagram showing an evaluation apparatus for executing a rotational accuracy evaluation method according to the present invention.

Next, an apparatus for testing rotational accuracy of a rolling bearing according to the present invention will be described below in detail with reference to the drawings. FIG. 10 is a block diagram of the test apparatus according to this embodiment, and FIG. 11 is a front view of the test apparatus.

Figure 11:
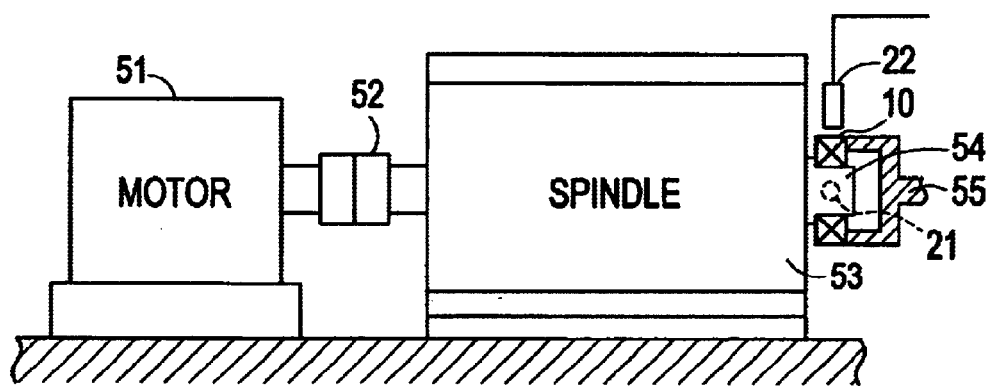
FIG. 11 is a front view of the evaluation apparatus of FIG. 10.
Figure 12:
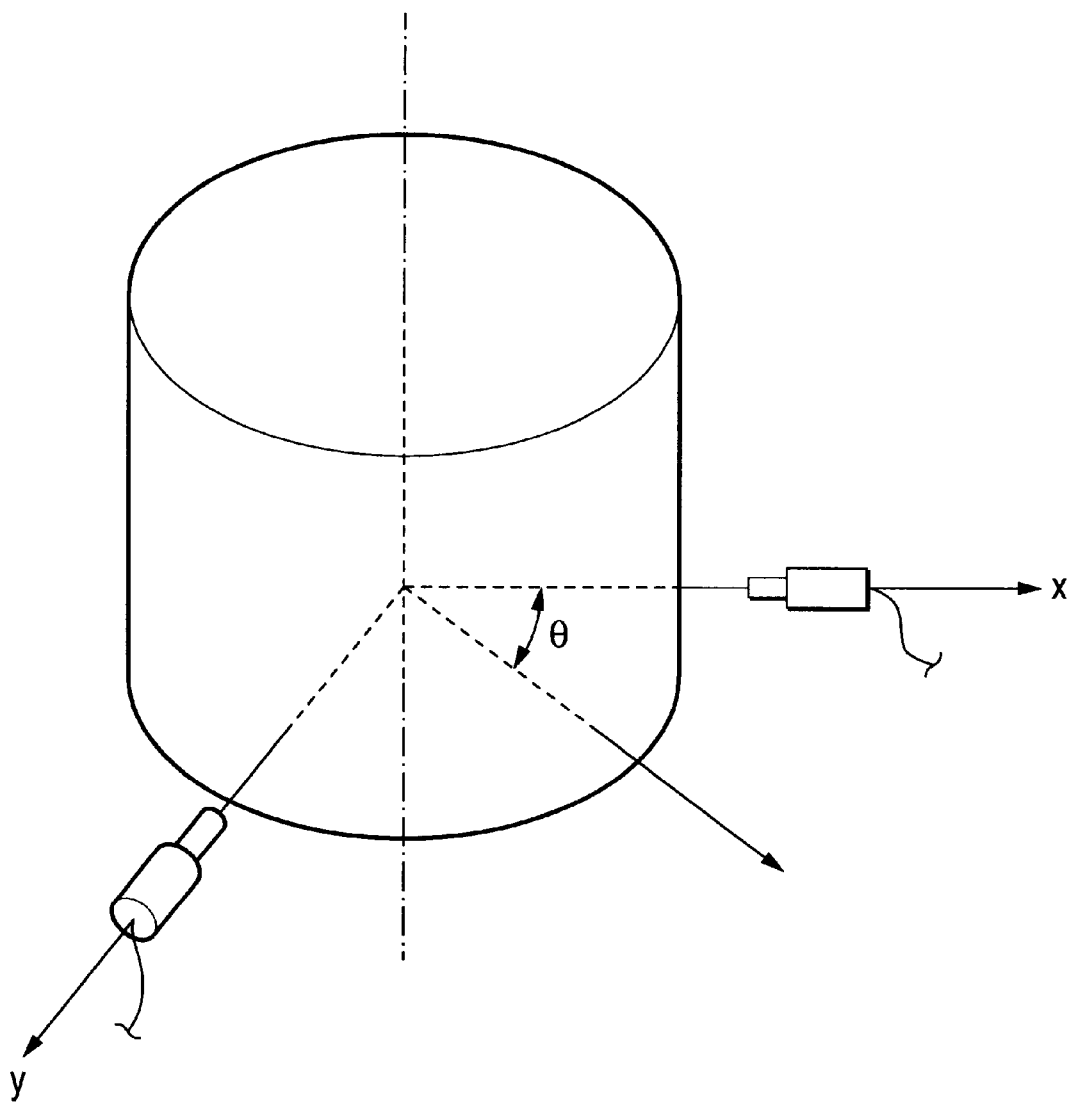
FIG. 12 is a view for explaining a relate-art method of evaluating radial vibration of a rotating body.

In FIGS. 10 and 11, a test apparatus 1 has two displacement probes 21 and 22 of a non-contact optical type, two displacement measuring units 31 and 32, a computer 41, a motor 51, a coupling 52 connected to a rotational shaft of the motor, and a spindle 53 provided with a rotating shaft 54 connected to the coupling 48 52. The spindle 53 also has a bearing (not shown) incorporated therein where the bearing can be used a highly accurate air support type.

The rotational shaft 54 is supported horizontally to the spindle 53. A rolling bearing 10 is fitted to an end portion of the rotational shaft 54 protruded from a front surface of the spindle 53. The rolling bearing 10 is pressed toward the spindle 53 by a pre-load mechanism 55. The two displacement probes 21 and 22 are disposed on the outer circumference of a fixed ring (outer ring) 11 of the rolling bearing 10 so that the sensor axes thereof are extended vertically (in the y direction in FIG. 10) and horizontally (in the x direction in FIG. 10) respectively so as to cross the axis of the rolling bearing at right angles.

To carry out measurement, the rotational shaft 54 is rotated at a fixed velocity through the coupling 52 by the motor 51. At this time, the displacement probe 22 detects a vertical vibration component in a radial direction of the fixed ring 11 and transmits the detected vibration component as an electric signal to the displacement measuring unit 32. The displacement measuring unit 32 converts the received electric signal into a voltage signal corresponding to the vertical displacement quantity of the fixed ring 11 and transmits the voltage signal to the computer 41. On the other hand, the displacement probe 21 detects a horizontal vibration component in a radial direction of the fixed ring 11 and transmits the detected vibration component as an electric signal to the displacement measuring unit 31. The displacement measuring unit 31 converts the received electric signal into a voltage signal corresponding to the horizontal displacement quantity of the fixed ring 11 and transmits the voltage signal to the computer 41.

The computer 41 converts the voltage signals into synchronizing digital values through an A/D converter (not shown but contained in the computer 41), and stores the digital values. Further, the computer 41 Fourier-transforms the stored digital values, extracts predetermined frequency components, calculates desired vibration values and makes evaluation as follows.

The rotational accuracy evaluation method according to the present invention, which will be described below, is based on discrete Fourier transform on the computer 41, using a sequence of discrete digital values given from the A/D converter in practice. However, the method will be described on the basis of Fourier series expansion of continuous analog periodical signals for the sake of easy understanding.

Assume now that the rotating ring (inner ring) 12 of the ball bearing 10 with a number Z of balls 13 rotates at an angular velocity A while tracing the raceway of the outer ring 11 which is a fixed ring. With the waviness lying all over the raceway of the outer ring 11, periodical elastic displacement is produced between each of balls 13 and the raceway of the outer ring 11 so as to generate radial vibration. Assume that Cf (n=−∞ to ∞) designates a Fourier expansion coefficient for time series of such periodical elastic displacement when a reference point is imagined on the raceway, and that the displacement prove 21 is placed at an azimuth distant from this reference point by an angle θ. Then, time series f(t) of the elastic displacement observed (that is, frequency components of the fixed ring 11) are given by the following expression (33). (33)

$$f(t) = \sum_{k=0}^{Z-1} \sum_{n=-\infty}^{\infty} C_n \exp\{jn(\omega_c t + 2\pi k/Z)\}\cos(\omega_c t + 2\pi k/Z - \theta) \quad (33)$$

$\omega_c$: frequency of revolution of balls

The expression (33) can be transformed into an expression (34) expressed by only frequency components of integral multiples of Zag after a pinch of calculation.

$$f(t) = \sum_{m=-\infty}^{\infty} (A_{mZ-1} e^{-j\theta} + A_{mZ+1} e^{j\theta})\exp(jmZ\omega_c t) \quad (34)$$

m =1, 2, 3 . . . (an order component)
where, $A_n$ is replaced by $ZC_n/2$. That is, only components corresponding to the numbers of waviness which are (integer multiples of the number Z of balls) ±1 appear as vibration. When the displacement prove 22 is placed at an azimuth distant from the displacement prove 21 by an angle α (90 degrees in FIG. 10), time series $f_\alpha(t)$ of the elastic displacement observed by the displacement prove 22 are given by the following expression (35).

$$f_\alpha(t) = \sum_{m=-\infty}^{\infty} \{A_{mZ-1} e^{-j(\theta+\alpha)} + A_{mZ+1} e^{j(\theta+\alpha)}\}\exp(jmZ\omega_c t) \quad (35)$$

On the assumption that F(m) and $F_\alpha(m)$ designate Fourier expansion coefficients of the order m of the time series f(t) and $f_\alpha(t)$ of the elastic displacement observed, respectively, the following expressions (36) and (37) are established with respect to the coefficients of components of the order m in accordance with the expressions (34) and (35).

$$A_{mz-1} e^{-j\theta} + A_{MZ+1} e^{j\theta} = F(m) \quad (36)$$

$$A_{mz-1} e^{-j(\theta+\alpha)} + A_{mz+1} e^{j(\theta+\alpha)} = F_\alpha(m) \quad (37)$$

Here, if the expressions (36) and (37) are regarded as complex simultaneous equations with two unknowns $A_{mz-1} e^{-j\theta}$ and $A_{mz+1} e^{j\theta}$, and the complex simultaneous equations are solved, the following solutions can be obtained.

$$A_{mZ-1} e^{-j\theta} = \frac{e^{j\alpha} F(m) - F_\alpha(m)}{2j\sin\alpha}, \quad A_{mZ+1} e^{j\theta} = \frac{F_\alpha(m) - e^{-j\alpha} F(m)}{2j\sin\alpha} \quad (38)$$

Provided α≠nπ (n: integer) must be established. To sum up, by use of respective Fourier expansion coefficients of the time series obtained by measuring vibration at two azimuths forming an angle of not 180°, a coefficient of a component caused by mZ−1(th) polygon and a coefficient of a component caused by mZ+1(th) polygon on the raceway of the fixed ring can be obtained respectively in accordance with the solutions shown in the expressions (38). Further, RMS values can be calculated as follows.

RMS value of component of mZ−1(th) polygon=$\sqrt{2}|A_{mz-1}|$=
$\sqrt{2}|A_{mz-1} e^{-j\theta}|$ \hfill (39)

RMS value of component of mZ+1(th) polygon=$\sqrt{2}|A_{mz+1}|$=
$\sqrt{2}|A_{mz+1} e^{j\theta}|$ \hfill (40)

(Embodiment 2)

Next, a maximum amplitude value and a maximum azimuth of vibration of the angular velocity $mZ\omega_c$ are obtained. With reference to the expression (34), the vibration which are the sum of components of orders m and −m is given by the following expression (41).

$$f_m(t) = (A_{mz-1} e^{-j\theta} + A_{mz+1} e^{j\theta}) e^{jmz\omega_c t} + (A_{-(mZ-1)} e^{j\theta} + A_{-(mz+1)} e^{j\theta}) e^{-jmz\omega_c t} \quad (41)$$

Assume now that θ designates the maximum azimuth angle relative to the reference point at which the expression (41) exhibits the maximum amplitude. Then, since $A_n$ (n=∞ to ∞) is a Fourier expansion coefficient of a real-number function, the relation $A_{-n}=A_n^*$ (conjugate of $A_n$) is established, and the relations $A_{mz-1}=|A_{mz-1}|e^{j\psi}$ and $A_{mz+1}=|A_{mz+1}|e^{j\Phi}$ are established on the basis of the absolute values and the phases. Thus, the expression (41) can be transformed into the following expression (42).

$$f_m(t) = 2\{|A_{mz-1}|\cos(mZ\omega_c t - \theta + \phi) + |A_{mz+1}|\cos(mz\omega_c t + \theta + \phi)\} \quad (42)$$

The expression (42) forms vibration of maximum amplitude or minimum amplitude as shown in the following expression (43) in accordance with the conditions among θ, ψ and Φ.

$$\begin{aligned}
f_{mMAX}(t) &= 2(|A_{mZ-1}| + |A_{mZ+1}|)\cos\{mZ\omega_c t + & \theta &= (\varphi - \phi)/2 + n\pi \\
& (\varphi + \phi)/2 + n\pi\}, & & \\
f_{mMIN}(t) &= 2||A_{mZ-1}| - |A_{mZ+1}||\cos\{mZ\omega_c t + & \theta &= (\varphi - \phi)/2 + \\
& (\varphi + \phi)/2 + (n+1/2)\pi\}, & & (n+1/2)\pi
\end{aligned} \quad (43)$$

where, n is an integer.

From the above description, it is understood that the maximum RMS value of vibration of the angular velocity $mZ\omega_c$ is $\sqrt{2}(|A_{mZ+1}|+|A_{mz+1}|)$, and the minimum RMS value is $\sqrt{2}||A_{mZ-1}|-|A_{mZ+1}||$.

To obtain the maximum azimuth of vibration, the expressions (36) and (37) of the coefficients of the order m at two azimuths are used. The coefficient $F_\gamma(m)$ of the order m of vibration at an azimuth distant from the displacement probe 21 by an angle γ is given by the following expression (44).

$$F_\gamma(m) = \{F(m)\sin(\alpha-\gamma) + F_\alpha(m)\sin\gamma\}/\sin\alpha \quad (44)$$

Here, a square of the amplitude is obtained and differentiated. The differentiated square of the amplitude is put as 0. Then, $\gamma$ is calculated to satisfy this condition. From the expression (44), $$\begin{aligned}
\sin^2\alpha \cdot |F_\gamma(m)|^2 &= \{F(m)\sin(\alpha-\gamma) + \\
F_\alpha(m)\sin\gamma\}\{\overline{F}(m)\sin(\alpha-\gamma) + \overline{F}_\alpha(m)\sin\gamma\} &= \\
|F(m)|^2\sin^2(\alpha-\gamma) + |F_\alpha(m)|^2\sin^2\gamma + \\
\{F(m)\overline{F}_\alpha(m) + \overline{F}(m)F_\alpha(m)\}\sin\gamma\sin(\alpha-\gamma) \\
\sin^2\alpha \cdot \frac{\partial}{\partial\gamma}|F_\gamma(m)|^2 &= [F(m)|^2\cos2\alpha + |F_\alpha(m)|^2 - \\
\{F(m)\overline{F}_\alpha(m) + \overline{F}(m)F_\alpha(m)\}\cos\alpha]\sin2\gamma + \\
[-|F(m)|^2\sin2\alpha + \{F(m)\overline{F}_\alpha(m) + \overline{F}(m)F_\alpha(m)\}\sin\alpha]\cos2\gamma = 0
\end{aligned} \quad (45)$$

Thus, the following expression is obtained.

$$2\gamma_0 = \tan^{-1}\left\{\frac{|F_\alpha(m)|^2\sin2\alpha - \{F(m)\overline{F}_\alpha(m) + \overline{F}(m)F_\alpha(m)\}\sin\alpha}{|F(m)|^2\cos2\alpha + |F_\alpha(m)|^2 - \{F(m)\overline{F}_\alpha(m) + \overline{F}(m)F_\alpha(m)\}\cos\alpha}\right\} \quad (46)$$

When $\gamma = \gamma_o$, $|F_\gamma(m)|^2$ becomes maximal (signed with +) or minimal (signed with −)as shown in the following expression (47).

$$|F_\gamma(m)|^2 = \quad (47)$$

$$\frac{1}{2\sin^2\alpha}\left[|F(m)|^2 + |F_\alpha(m)|^2 - \{F(m)\overline{F}_\alpha(m) + \overline{F}(m)F_\alpha(m)\}\cos\alpha \pm \right.$$
$$\left. \sqrt{\begin{array}{l}|F^2(m) + F_\alpha^2(m)|^2 + 2|F(m)|^2|F_\alpha(m)|^2(1+\cos2\alpha) - \\ 2\{|F(m)|^2 + |F_\alpha(m)|^2\}\{F(m)\overline{F}_\alpha(m) + \overline{F}(m)F_\alpha(m)\}\cos\alpha\end{array}}\right]$$

The maximum RMS value $\sqrt{2}(|A_{mZ-1}| + |A_{mZ+1}|)$ and the minimum RMS value $\sqrt{2}||A_{mZ-1}| - |A_{mZ+1}||$ provided in the description of the expression (43) are equal to $\sqrt{2}|F_\gamma(m)|$. Incidentally, the azimuth exhibiting the maximum value and the azimuth exhibiting the minimum value are determined in accordance with the following method.

When $|F(m)|^2 \cos 2\alpha + |F_\alpha(m)|^2 - \{F(m)F^*_\alpha(m) + F^*(m)F_\alpha(m)\}\cos\alpha \leq 0$, vibration is maximal at azimuths $\gamma_o$ and $\gamma_o + \pi$ and minimal at azimuths $\gamma_o \pm \pi/2$ if $|\gamma_o| \leq \pi/4$, and minimal at azimuths $\gamma_0$ and $\gamma_o + \pi$ and maximal at azimuths $\gamma_o \pm \pi/2$ if $\pi/4 < |\gamma_o| < \pi/2$. On the other hand, when $|F(m)|^2\cos2\alpha + |F_\alpha(m)|^2 - \{F(m)F^*_\alpha(m) + F^*(m)F_\alpha(m)\}\cos\alpha > 0$, vibration is minimal at azimuths $\gamma_o$ and $\gamma_o + \pi$ and maximal at azimuths $\gamma_o \pm \pi/2$ if $|\gamma_o| \leq \pi/4$, and maximal at azimuths $\gamma_o$ and $\gamma_o + \pi$ and minimal at azimuths $\gamma_o \pm \pi/2$ if $\pi/4 < |\gamma_o| \leq \pi/2$.

For example, this can be understood instinctively if it is assumed that the angle between the displacement probes 21 and 22 is 90°, that is, $\alpha = \pi/2$. The first condition is $|F(m)|^2 \geq |F_\alpha(m)|^2$. If $|\gamma_o| \leq \pi/4$, the maximum azimuth is at the angles $\gamma_o$ and $\gamma_o + \pi$ relative to the displacement probe 21. If $\pi/4 < |\gamma_o| \leq \pi/2$, the maximum azimuth is at the angles $\gamma_o \pm \pi/2$ relative to the displacement probe 21. Then, the minimum azimuth is a direction perpendicular to the maximum azimuth. The other condition is $|F(m)|^2 < |F_\alpha(m)|^2$. If $|\gamma_o| < \pi/4$, the maximum azimuth is at the angles $\gamma_o \pi/2$ relative to the displacement probe 21. If $\pi/4 < |\gamma_o| < \pi/2$, the maximum azimuth is at the angles $\gamma_o$ and $\gamma_o + \pi$ relative to the displacement probe 21. The minimum azimuth is likewise an azimuth perpendicular to the maximum azimuth.

The fixed ring of the bearing may be marked in the positions of the maximum azimuth C and/or minimum azimuth D determined as described above, as shown in FIG. 10. Although how to mark the fixed ring is not related directly to the present invention, scratching, painting, stamping, etc. can be conceived.

(Embodiment 3)

In the embodiment 3 of the present invention, the vibration of the rotating ring can be obtained by one of the measuring probes which are the above-mentioned vibration measuring sensors, as shown in the following expression (48).

$$f(t) = \sum_{k=0}^{Z-1}\sum_{n=-\infty}^{\infty} C_n\exp\{-jn(\omega_i t - 2\pi k/Z)\}\cos(\omega_c t + 2\pi k/Z - \theta) \quad (48)$$

where that $\omega_1 = \omega_\gamma - \omega_c$ when $\omega_\gamma$ designates the rotation angular velocity of revolution of a rotating ring, and $\omega_c$ designates the angular velocity of revolution of a rolling element. The expression (48) can be transformed into the following expression (49) expressed by only components of numbers, which are (integer multiples of the number of balls) ±1, after a pinch of calculation.

$$f(t) = \sum_{m=-\infty}^{\infty} [ \quad (49)$$

$$B_{mZ-1}e^{-j\theta}\exp\{-j(mZ\omega_i - \omega_r)t\} + B_{mZ+1}e^{j\theta}\exp\{-j(mZ\omega_i + \omega_r)t\}]$$

where, $B_n = ZC_n/2$.

The absolute values $|B_{mZ-1}|$ and $|B_{mZ+1}|$ of the Fourier expansion coefficients $B_{mZ-1}e^{-j\theta}$ and $B_{mZ+1}e^{j\theta}$ of the orders $mZ-1$ and $mZ+1$ obtained from Fourier transforms can be calculated easily. When the rotating ring and the fixed ring are used reversely at that time, the components of the orders $mZ-1$ and $mZ+1$ are combined into one frequency component $mZ\omega_c$ as described above, and the magnitude thereof depends on the azimuth. The maximum RMS value and the minimum RMS value of the amplitude of the synthesized vibration are $\sqrt{2}(|B_{mZ-1}| + |B_{mZ++1}|)$ and $\sqrt{2}||B_{mZ-1}| + |B_{mZ+1}||$, respectively.

(Embodiment 4)

In Embodiments 1, 2 and 3, there has been described the case where vibration of a rolling bearing can be regarded as rigid motion when the raceways of a fixed ring and a rotating ring produce elastic deformation between each of the raceways and each of rolling elements when the rolling bearing rotates, and there is some waviness in each of the raceways. When the rolling bearing rotates alone, displacement caused by slight elastic deformation is observed in the outside surface of an outer ring or the inside surface of an inner ring in connection with the passage of the rolling elements in addition to such vibration like rigid motion. Particularly, the angular frequency of the passage of the rolling elements coincides with the above-mentioned $Z\omega_c$. Accordingly, in the conventional measurement, the above-mentioned vibration component caused by the waviness of the raceway of the fixed ring cannot be evaluated separately from such composite vibration.

In the fourth embodiment of the present invention, a third displacement probe 23 as shown by the dotted line in FIG. 10 is disposed in a position at an angle P with respect to the first displacement probe 21. Thus, a Fourier expansion coefficient $F'_\beta(m)$ of the order m of a measured value $f_\beta(t)$ is obtained in addition to measurement results F'(m) and F'$_\alpha$(m) similar to those in the above-mentioned embodiment. At this time, the following complex simultaneous equations with three unknowns $A_{mZ-1}e^{-j\theta}$, $A_{mZ+1}e^{j\theta}$ corresponding to the expressions (36) and (37) and $D_{mz}e^{-jmZ\theta}$ for an elastic deformation component are established.

$$A_{mZ+1}e^{-j\theta}+A_{mZ+1}e^{j\theta}D_{mZ}e+^{jmZ\theta}=F'(m) \quad (50)$$

$$A_{mZ-1}e^{-j(\theta+\alpha)}+A_{mZ+1}e^{j(\theta+\alpha)}+D_{mZ}e^{-jmZ(\theta+\alpha)}=F'_\alpha(m) \quad (51)$$

$$A_{mZ-1}e^{-1(\theta+\beta)}+A_{mZ+1}e^{j(\theta+\beta)}+D_{mZ}e^{-jmZ(\theta+\beta)}=F'_\beta(m) \quad (52)$$

On the assumption that $\Delta=e^{j(\alpha-mZ\beta)}e^{-j(\beta+mZ\alpha)}-e^{-j(\alpha+mZ\beta)}-e^{j(\beta-mZ\alpha)}+e^{-j(\alpha-\beta)}-e^{j(\alpha-\beta)}\neq 0$, amplitude values of respective components can be calculated from solutions as follows.

$$|A_{mZ-1}|=|A_{mZ-1}e^{-j\theta}|=|\{(e^{j(\alpha-mZ\beta)}-e^{j(\beta-mZ\alpha)})F'(m)+ \quad (53)$$
$$(e^{j\beta}-e^{-jmZ\beta})F'_\alpha(m)+(e^{-jmZ\alpha}-e^{j\alpha})F'_\beta(m)\}/\Delta|$$

$$|A_{mZ+1}|=|A_{mZ+1}e^{-j\theta}|=|\{(e^{-j(\beta+mZ\alpha)}-e^{-j(\alpha+mZ\beta)})F'(m)+ \quad (54)$$
$$(e^{-jmZ\beta}-e^{-j\beta})F'_\alpha(m)+(e^{-j\alpha}-e^{-jmZ\alpha})F'_\beta(m)\}/\Delta|$$

Accordingly, the maximum RMS value is obtained as $\sqrt{2}(|A_{mZ-1}|+|A_{mZ+1}|)$, and the minimum RMS value is obtained as $\sqrt{2}\||A_{mZ-1}|-|A_{mZ+1}|\|$, in the same manner as those in the above-mentioned embodiment.

Next, the method for obtaining the azimuth in which vibration is maximal (minimal) will be described. A third solution of the complex simultaneous equations with three unknowns is obtained as shown in the following expression (55)

$$D_{mz}e^{-jmZ\theta}=\{(e^{-j(\alpha-\beta)}-e^{j(\alpha-\beta)}F'(m)+(-^{j\beta}-e^{j\beta})F'_\alpha(m)+$$
$$(e^{j\alpha}-e^{-j\alpha})F_\beta(m)\}/\Delta \quad (55)$$

By use of the above-mentioned measurement results F'(m) and F'$_\alpha$(m) and the result of the expression (55), the expressions (56) and (57) are calculated.

$$F(m)=F'(m)-D_{mZ}e^{-jmZ\theta} \quad (56)$$

$$F_\alpha(m)F'_\alpha(m)-D_{mZ}e^{-jmZ(\theta+\alpha)} \quad (57)$$

Then, if the expressions and methods in embodiment 2 are applied to the results of the expressions (56) and (57), the maximum (or minimum) azimuth of the component of the angular frequency $mZ\omega_c$ of the fixed ring can be obtained.

Although not referred explicitly to in the above description of this embodiment, the two different azimuths need not be perpendicular to each other. In addition, it is possible to use one sensor that can measure vibration at two different azimuths simultaneously. Further, the sensors are not limited to displacement probes, but other sensors having a relation of differential/integral calculus may be used, or evaluation may be made not only by displacement but also by velocity or acceleration. The relation between differential or integral calculus of vibration signals and calculation for Fourier expansion coefficients are apparent to those skilled in the art. Thus, the description thereon is omitted.

As described above in detail, accordance to the method of evaluating a radial vibration of a rotating body of the present invention, frequency components obtained by measurement from two directions are transformed into frequency spectra by Fourier transform, and the amplitude of radial vibration with a specific frequency at each azimuth is calculated on the two-direction frequency spectra obtained by Fourier transform. Accordingly, the necessity of performing Fourier transform at all azimuths can be eliminated. Hence, NRRO vibration components of radial vibration of the rotating body in a production line can be evaluated in real time without any great deal of calculation. Then, a rotation unit having a rotating body and a fixed member marked at such an azimuth can be provided.

Further, according to the method of evaluating a rotational accuracy of a rolling bearing of the present invention, by use of Fourier expansion coefficients of radial vibration at two different azimuths in a fixed ring of a rolling bearing rotating at a constant velocity, a maximum (or minimum) value of amplitude of an vibration component caused by the raceway shape of the fixed ring can be calculated and evaluated, and the azimuth in which the amplitude is maximal (minimal) can be calculated. Then, a rolling bearing with a fixed ring marked at such an azimuth can be provided.

In addition, it is possible to provide a method for calculating a maximum (or minimum) value of amplitude of an vibration component caused by the raceway shape of a fixed ring when a rotating ring is used as a fixed ring at the time of evaluation of the rolling bearing. Thus, it will go well if an apparatus for evaluating the rolling bearing according to the present invention can rotate only one of the outer and inner rings. Accordingly, such an apparatus can be achieved inexpensively.

Further, in the measuring condition in which superimposition of vibration caused by elastic deformation of the fixed ring with the passage of rolling elements cannot be disregarded, a Fourier expansion coefficient of radial vibration at a third azimuth is used as well as the above-mentioned Fourier expansion coefficients of radial vibration at two different azimuths. Accordingly, a maximum (or minimum) value of amplitude of an vibration component caused by the raceway shape of the fixed ring can be evaluated without being influenced by the above-mentioned vibration caused by the elastic deformation, and the azimuth in which the amplitude is maximal (minimal) can be calculated. Then, a rolling bearing with a fixed ring marked at such an azimuth can be provided.

What is claimed is:

1. A method of evaluating a radial vibration of a rotating body, said method comprising:

measuring vibration components of the radial vibration in two different directions;

transferring the vibration components obtained in the two directions into frequency spectra respectively by Fourier transform;

calculating an amplitude of the radial vibration for each azimuth in a direction of rotation of said rotating body on the basis of the frequency spectra obtained in the two directions; and selecting the maximum amplitude of the radial vibration from amplitudes obtained at all azimuths, and evaluating the radial vibration of the rotating body on the basis of the maximum amplitude.

2. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by $\Delta t$ to thereby obtain a sequence of N discrete values $\{x_n=x\,(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

selecting frequency sample values $(X_{ki}, Y_{ki}, i=1, \ldots P\}$ corresponding to P frequency points $\{k_i, i=1, \ldots P\}$ corresponding to P specific frequencies $\{f_i, i=1, \ldots P\}$ from the frequency sample values $\{X_k, Y_k, k=0, 1, \ldots N-1\}$, and calculating $\{|X_{ki}|^2, |Y_{ki}|^2,$ Re $(X_{ki}Y_{ki}^*), i=1, \ldots P\}$;

calculating RMS amplitude values $\{2^{1/2}|F_{ki}(2j\pi)|, j=0, 1, \ldots M/2-1\}$ for each frequency point $k_i$ at each azimuth $\{\theta_j=2j\pi/M, j=0, 1, \ldots M/2-1\}$ equivalent to 0 to $\pi$ among the azimuths obtained by dividing the direction of rotation of the rotating body into M parts;

s selecting a maximum RMS amplitude value from the calculated RMS amplitude values $\{2^{1/2}|F_{ki}(2j\pi/M)|, j=0, 1, \ldots M/2-1\}$ for each frequency point k, as an RMS evaluation value $A_{ki}$ at the frequency point $k_i$; and evaluating the radial vibration of the rotating body on the basis of the RMS evaluation values $A_{ki}$.

3. The method of evaluating a radial vibration of a rotating body according to claim 2, further comprising:

storing the specific frequencies $\{f_i, i=1, \ldots P\}$ of NRRO vibration components and the corresponding RMS evaluation values $\{A_{ki}, i=1, \ldots P\}$.

4. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by $\Delta t$ to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

selecting frequency sample values $\{X_{ki}, Y_{ki}, i=1, \ldots P\}$ corresponding to P frequency points $\{k_i, i=1, \ldots P\}$ corresponding to P specific frequencies $\{f_i, i=1, \ldots P\}$ from the frequency sample values $\{X_k, Y_k, k=0, 1, \ldots N-1\}$, and calculating $\{|X_{ki}|^2, |Y_{ki}|^2,$ Re $(X_{ki}Y_{ki}^*), i=1, \ldots P\}$;

calculating RMS amplitude values $\{2^{1/2}|F_{ki}(2j\pi/M)|, 2^{1/2}|F_{ki}(2j\pi/\pm\pi/2)|, j=0, 1, \ldots M/4-1\}$ for each frequency point $k_i$ at each azimuth $\{\theta=2j\pi/M, j=0, 1, \ldots M/4-1\}$ equivalent to 0 to $2/\pi$ among the azimuths obtained by dividing the direction of rotation of the rotating body into M parts;

selecting a maximum RMS amplitude value from the calculated RMS amplitude values $\{2^{1/2}|F_{ki}(2j\pi/M)|, 2^{1/2}|F_{ki}(2j\pi/+\pi/2)|, j=0, 1, \ldots M/4-1\}$ for each frequency point $k_i$ as an RMS evaluation value $A_{ki}$ at the frequency point $k_i$; and evaluating the radial vibration of the rotating body on the basis of the RMS evaluation values $A_{ki}$.

5. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by $\Delta t$ to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

selecting frequency sample values $\{X_{ki}, Y_{ki}, i=1, \ldots P\}$ corresponding to P frequency points $\{k_i, i=1, \ldots P\}$ corresponding to P specific frequencies $\{f_i, i=1, \ldots P\}$ from the frequency sample values $\{X_k, Y_k, k=0, 1, \ldots N-1\}$, and calculating $\{|X_{ki}|^2, |Y_{ki}|^2,$ Re$(X_{ki}Y_{ki}^*), i=1, \ldots P\}$;

calculating a RMS evaluation value $\{A_{ki}=2^{1/2}|F_{ki}(\Phi_{ki}/2)|, i=1, \ldots P\}$ for each frequency point k, on the basis of the following expression:

$$2^{1/2}|F_h(\phi_h/2)|=(|X_h|^2+|Y_h|^2+X_h^2+Y_h^2|)^{1/2}$$

evaluating the radial vibration of the rotating body on the basis of the RMS evaluation values $A_{ki}$.

6. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by $\Delta t$ to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

selecting frequency sample values $\{X_{ki}, Y_{ki}, i=1, \ldots P\}$ corresponding to P frequency points $\{k_i, i=1, \ldots P\}$ corresponding to P special frequencies $\{f_i, i=1, \ldots P\}$ from the frequency sample values $\{X_k, Y_k, k=0, 1, \ldots N-1\}$, and calculating $\{|X_{ki}|^2, |Y_{ki}|^2,$ Re $(X_{ki}Y_{ki}^*), i=1, \ldots P\}$;

calculating a total RMS evaluation value $A_{total}$ for frequency points $\{k_i, i=1, \ldots P\}$ on the basis of the following expression:

$$A_{total} = \left\{ \sum_{i=1}^{p}(|X_{ki}|^2+|Y_{ki}|^2) + \left[ \left\{\sum_{i=1}^{p}(|X_{ki}|^2-|Y_{ki}|^2)\right\}^2 + 4\left\{\sum_{i=1}^{p}\mathrm{Re}(X_{ki}Y_{ki}^*)\right\}^2 \right]^{1/2} \right\}^{1/2}$$

evaluating the radial vibration of the rotating body on the basis of the total RMS evaluation value $A_{total}$.

7. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by $\Delta t$ to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

selecting frequency sample values $\{X_{ki}, Y_{ki}, i=1, \ldots P\}$ corresponding to P frequency points $\{k_i, i=1, \ldots P\}$ corresponding to P special frequencies $\{f_i, i=1, \ldots P\}$ from the frequency sample values $\{X_k, Y_k, k=0, 1, \ldots N-1\}$, and calculating $\{|X_{ki}|^2, |Y_{ki}|^2,$ Re $(X_{ki}Y_{ki}^*), i=1, \ldots P\}$;

calculating a power spectrum for frequency points $\{k_i, i=1, \ldots P\}$ at each azimuth $\{\theta_j=2j\pi/M, j=0, 1, \ldots M/2-1\}$ equivalent to 0 to $\pi$ among the azimuths obtained by dividing the direction of rotation of the rotating body into M parts on the basis of the following expression:

$$\sum_{i=1}^{p}|F_{ki}(\theta)|^2 =$$

-continued $$\sum_{i=1}^{p}|X_{ki}|^2\cos^2\theta + \sum_{i=1}^{p}|Y_{ki}|^2\sin^2\theta + 2\sum_{i=1}^{p}\text{Re}(X_{ki}Y_{ki}^*)\sin\theta\cos\theta$$

selecting the maximum value of the power spectra as the RMS evaluation value $A_{total}$; and, evaluating the radial vibration of the rotating body on the basis of the total RMS evaluation value $A_{total}$.

8. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by Δt to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

calculating $\{|X_{ki+1}|^2, |Y_{ki+1}|^2, \text{Re}(X_{ki+1}Y_{ki+1}^*), l=-m/2, -m/2+1, 0, \ldots m/2-1\}$ at a set of m frequency points $\{k_i-m/2, k_i-m/2+1, \ldots k_i \ldots k_i+m/2-1\}$ which are near to each of P frequency points k corresponding to P specific frequencies $\{f_i, i=1, \ldots P\}$ and adjacent to one another;

calculating squares $\{F_{ki+1}(2j\pi/M)|^2 l=-m/2, -m/2+1, \ldots 0, 1, \ldots m/2-1\}$ of frequency sample values of vibration at the m frequency points $\{k_i-m/2, k_i-m/2+1, \ldots, k_i, \ldots k_i+m/2-1\}$ in accordance with azimuths $\{\theta_j=2j\pi/M, j=0, 1, \ldots M/2-1\}$ equivalent to 0 to π among the azimuths obtained by dividing the direction of rotation of the rotating body into M parts;

calculating RMS amplitude values with the calculated squares $\{|F_{ki+1}(2j\pi/M)|^2, l=-m/2, -m/2+1, \ldots 0, 1, \ldots m/2-1\}$ by the following expression:

$$\sqrt{2}\left(\sum_{l=-m/2}^{m/2-1}\left|F_{ki+l}\left(2j\frac{\pi}{M}\right)\right|^2\right)^{1/2};$$

selecting a maximum value of the RMS amplitude value from the RMS amplitude values $\{2^{1/2}F_{ki}(2j\pi/M), j=0, 1, \ldots M/2-1\}$ for each frequency point $k_i$ as the RMS evaluation values $A_{ki}$ at the frequency point $k_i$; and evaluating the radial vibration of the rotating body on the basis of the RMS evaluation values $A_{ki}$.

9. The method of evaluating a radial vibration of a rotating body according to claim 1, further comprising:

measuring a vibration component x(t) of the radial vibration in x-direction and a vibration component y(t) of the radial vibration in y-direction, and sampling the vibration components x(t) and y(t) by Δt to thereby obtain a sequence of N discrete values $\{x_n=x(n\Delta t), y_n=y(n\Delta t), n=0, 1, \ldots N-1\}$;

Fourier-transforming discretely the sequence of discrete values to thereby obtain frequency sample values $\{X_k, Y_k, k=0, 1, \ldots N-1\}$ expressed by $X_k$ and $Y_k$;

calculating $\{|X_{ki+1}|^2, |Y_{ki+1}|^2, \text{Re } X_{ki+1}Y_{ki+1}^*), l=-m/2, -m/2+1, \ldots 0, \ldots m/2-1\}$ at a set of m frequency points $\{k_i-m/2, k_i-m/2+1, \ldots k_i \ldots k_i+m/2-1\}$ which are near to each of P frequency points k, corresponding to P specific frequencies $\{f_i, i=1, \ldots P\}$ and adjacent to one another;

calculating squares $\{|F_{ki+1}(\phi_{ki}/2)|^2 l=-m/2, -m/2+1, 0, 1, \ldots m/2-1\}$ by the following expression:

$$|F_{ki+1}(\phi_{ki}/2)|^2=(|X_{ki+1}|^2+|Y_{ki+1}|^2+|X_{ki+1}^2+Y_{ki+1}^2|)/2$$

calculating a RMS evaluation values $A_{ki}$ at the frequency point k, by the following expression:

$$\sqrt{2}\left(\sum_{l=-m/2}^{m/2-1}\left|F_{ki+l}\left(\frac{\phi_{ki}}{2}\right)\right|^2\right)^{1/2}; \text{ and}$$

evaluating the radial vibration of the rotating body on the basis of the RMS evaluation values $A_{ki}$.

10. The method of evaluating a radial vibration of a rotating body according to claim 1, further comprising:

defining an azimuth exhibiting the maximum amplitude of the radial vibration as the maximum azimuth.

11. An apparatus for evaluating a radial vibration of a rotating body, wherein the radial vibration of the rotating body is measured by use of a method for evaluating the radial vibration according to claim 1.

12. A rotation unit having a rotating body and a fixed member, wherein the fixed member has a marked portion not a position of the maximum azimuth or a minimum azimuth on the basis of evaluation in accordance with a method for evaluating the radial vibration according to claim 10.

13. The rotation unit according to claim 12, wherein said rotation unit includes a rolling bearing or a spindle.

14. A method for evaluating a rotational accuracy of a rolling bearing comprising:

measuring a radial vibration of a fixed ring of the rolling bearing by two vibration measuring sensors disposed circumferentially with a phase a to thereby obtain sensor signals;

making the sensor signals discrete to thereby obtain two pieces of synchronizing digital data;

Fourier-transforming the digital data to thereby obtain vibration values F(m) and $F_\alpha$(m) of an order m of angular velocity obtaining unknown quantities $A_{mz-1}e^{-j\theta}$ and $A_{mz+1}e^{j\theta}$ by use of the vibration values F(m) and $F_\alpha$(m) on the basis of the following expressions:

$$A_{mz-1}e^{-j\theta}=\{e^{j\alpha}F(m)-F_\alpha(m)\}/2j \sin \alpha$$

$$A_{mz+1}e^{j\theta}=\{F_\alpha(m)-e^{-j\alpha}F(m)\}/2j \sin \alpha$$

(wherein m designates an order of vibration, Z designates the number of rolling elements, j designates an imaginary number such that $j^2=-1$, $\omega_c$ designates an angular velocity of revolution of the rolling elements, and θ designates a center angle between an unknown reference position on the fixed ring and one of the vibration measuring sensors);

obtaining, from said unknown quantities, RMS values of vibration components caused by mZ−1(th) polygon and mZ+1(th) polygon of the waviness of the fixed ring respectively in accordance with the following expressions:

RMS value of component of mZ−1(th) polygon=$\sqrt{2}|A_{mz-1}e^{-j\theta}|$

RMS value of component of mZ+1(th) polygon=$\sqrt{2}|A_{mz+1}e^{j\theta}|$;

and evaluating the rotational accuracy on the basis of the RMS values.

15. The method for evaluating a rotational accuracy of a rolling bearing according to claim 14, wherein a maximum amplitude value and a minimum amplitude value of angular velocity $mZ\omega_c$ are expressed by:

maximum RMS value=$\sqrt{2}(|A_{mz-1}|+|A_{mz+1}|)$ minimum RMS value=$\sqrt{2}||A_{mz-1}|-|A_{mz+1}||$.

16. The method for evaluating a rotational accuracy of a rolling bearing according to claim 15, wherein phases of said maximum amplitude value and said minimum amplitude value of said angular velocity $mZ\omega_c$ are:

maximal at $\gamma_o$ and $\gamma_o+\pi$ and minimal at $\gamma_o\pm\pi/2$ if $|\gamma_o|\leq\pi/4$, and minimal at $\gamma_o$ and $\gamma_o+\pi$ and maximal at $\gamma_o\pm\pi/2$ if $\pi/4<|\gamma_o|\leq\pi/2$, respectively when $|F(m)|^2\cos 2\alpha+|F_c(m)|^2-\{F(m)F^*_\alpha(m)+F^*(m)F_\alpha(m)\}\cos\alpha\leq 0$; and minimal at $\gamma_o$ and $\gamma_o+\pi$ and maximal at $\gamma_o\pm\pi/2$ if $|\gamma_o|\leq\pi/4$, and maximal at $\gamma_o$ and $\gamma_o+\pi$ and minimal at $\gamma_o\pm\pi/2$ if $\pi/4<|\gamma_o|\leq\pi/2$, respectively, when $|F(m)|^2\cos 2\alpha+|F_\alpha(m)|^2-\{F(m)F^*_\alpha(m)+F^*(m)F_\alpha(m)\}\cos\alpha>0$ (providing $2\gamma_o$ is given by the following expression:

$$2\gamma_0 = \tan^{-1}\left\{\frac{|F_\alpha(m)|^2\sin 2\alpha - \{F(m)\overline{F}_\alpha(m)+\overline{F}(m)F_\alpha(m)\}\sin\alpha}{|F(m)|^2\cos 2\alpha + |F_\alpha(m)|^2 - \{F(m)\overline{F}_\alpha(m)+\overline{F}(m)F_\alpha(m)\}\cos\alpha}\right\}.$$

17. A rolling bearing having a fixed ring and a rotating ring, wherein the fixed ring has a marked portion at a position where an vibration component is maximal or minimal on the basis of evaluation in accordance with a method for evaluating rotational accuracy according to claim 16.

18. The method for evaluating a rotational accuracy of a rolling bearing according to claim 14, wherein, in accordance with the following expression:

$$f(t) = \sum_{m=-\infty}^{\infty} [B_{mZ-1}e^{-j\theta}\exp\{-j(mZ\omega_i-\omega_r)t\} + B_{mZ+1}e^{j\theta}\exp(-j(mZ\omega_i+\omega_r)t)],$$

by use of said vibration values of said fixed ring, PMS values of vibration components caused by $mZ-1$ (th) polygon and $mZ+1$ (th) polygon of waviness of the fixed ring respectively when a rotating ring and said fixed ring are used reversely are set as:

RMS value of component of $mZ-1$(th) polygon=$\sqrt{2}|B_{mz-1}|$

RMS value of component of $mZ+1$(th) polygon=$\sqrt{2}|B_{mz+1}|$;

and a maximum amplitude value and a minimum amplitude value of angular velocity $mZ\omega_c$ are set as:

maximum RMS value=$\sqrt{2}(|B_{mz-1}|+|B_{mz+1}|)$ minimum RMS value=$\sqrt{2}||B_{mz-1}|-|B_{mz+1}||$.

19. The method for evaluating a rotational accuracy of a rolling bearing according to claim 14, further comprising:

disposing another vibration sensor at a phase $\beta$, wherein in accordance with the following expressions:

$$A_{mZ-1}e^{-j\theta} + A_{mZ+1}e^{j\theta} + D_{mZ}e^{-jmZ\theta} = F'(m)$$

-continued
$$A_{mZ-1}e^{-j(\theta+\alpha)} + A_{mZ+1}e^{j(\theta+\alpha)} + D_{mZ}e^{-jmZ(\theta+\alpha)} = F'_\alpha(m)$$

$$A_{mZ-1}e^{-j(\theta+\beta)} + A_{mZ+1}e^{j(\theta+\beta)} + D_{mZ}e^{-jmZ(\theta+\beta)} = F'_\beta(m)$$

On the assumption that $\Delta = e^{j(\alpha-mZ\beta)} + e^{-j(\beta+mZ\alpha)} - e^{-j(\alpha+mZ\beta)} - e^{j(\beta-mZ\alpha)}e^{-(\alpha-\beta)} - e^{j(\alpha-\beta)}\neq 0$, $|A_{mZ-1}| = |A_{mZ-1}e^{-j\theta}| = |\{(e^{j(\alpha-mZ\beta)} - e^{j(\beta-mZ\alpha)})F'(m) +$
$(e^{j\beta} - e^{-jmZ\beta})F'_\alpha(m) + (e^{-jmZ\alpha} - e^{j\alpha})F'_\beta(m)\}/\Delta|$ $|A_{mZ+1}| = |A_{mZ+1}e^{-j\theta}| = |\{(e^{-j(\beta+mZ\alpha)} - e^{-j(\alpha+mZ\beta)})F'(m) +$
$(e^{-jmZ\beta} - e^{-j\beta})F'_\alpha(m) + (e^{-j\alpha} - e^{-jmZ\alpha})F'_\beta(m)\}/\Delta|$, RMS values of vibration components caused by $mZ-1$ (th) polygon and $mZ+1$(th) polygon of waviness of the fixed ring respectively are set as:

RMS value of component of $mZ-1$(th) polygon=$\sqrt{2}|A_{mz-1}|$

RMS value of component of $mZ+1$(th) polygon=$\sqrt{2}|A_{mz+1}|$;

and a maximum amplitude value and a minimum amplitude value of angular velocity $mZ\omega_c$ are set as:

maximum RMS value=$\sqrt{2}(|A_{mz-1}|+|A_{mz+1}|)$ minimum RMS value=$\sqrt{2}||A_{mz-1}|-|A_{mz+1}||$.

20. The method for evaluating a rotational accuracy of a rolling bearing according to claim 18, wherein when $F(m)=F'(m)-D_{mz}e^{-jmz\theta}$ and $F_\alpha(m)=F_\alpha'(m)-D_{mz}e^{-jmz(\theta+\alpha)}$ are set, phases of said maximum amplitude value and said minimum amplitude value of said angular velocity $mZ\omega_c$ are:

maximal at $\gamma_o$ and $\gamma_o+\pi$ and minimal at $\gamma_o\pm\pi/2$ if $|\gamma_o|\leq\pi/4$, and minimal at $\gamma_o$ and $\gamma_o+\pi$ and maximal at $\gamma_o\pm\pi/2$ if $\pi/4<|\gamma_o|<\pi/2$, respectively, when $|F(m)|^2\cos 2\alpha+|F_\alpha(m)|^2-\{F(m)F^*_\alpha(m)+F^*(m)F_\alpha(m)\}\cos\alpha\leq 0$; and minimal at $\gamma_o$ and $\gamma_o+\pi$ and maximal at $\gamma_o\pm\pi/2$ if $|\gamma_o|\leq\pi/4$, and maximal at $\gamma_o$ and $\gamma_o+\pi$ and minimal at $\gamma_o+\pi/2$ if $\pi/4<|\gamma_o|<\pi/2$, respectively, when $|F(m)|^2\cos 2\alpha+|F_\alpha(m)|^2-\{F(m)F^*_\alpha(m)+F^*(m)F_\alpha(m)\}\cos\alpha>0$ (providing $2\gamma_o$ is given by the following expression:

$$2\gamma_0 = \tan^{-1}\left\{\frac{|F_\alpha(m)|^2\sin 2\alpha - \{F(m)\overline{F}_\alpha(m)+\overline{F}(m)F_\alpha(m)\}\sin\alpha}{|F(m)|^2\cos 2\alpha + |F_\alpha(m)|^2 - \{F(m)\overline{F}_\alpha(m)+\overline{F}(m)F_\alpha(m)\}\cos\alpha}\right\}.$$

21. An apparatus for evaluating a rotational accuracy of a rolling bearing, wherein the rotational accuracy of the rolling bearing is measured by use of a method for evaluating rotational accuracy according to claim 14.

22. A method of evaluating asynchronous radial vibration components called Non Repeatable Round Out of a rotating body, said method comprising:

measuring vibration components of the radial vibration in two different directions with two displacement sensors;

transferring the vibration components obtained in the two directions into frequency spectra respectively by Fourier transform;

calculating an amplitude of the radial vibration for each azimuth in a direction of rotation of said rotating body on the basis of the frequency spectra obtained in the two directions; and selecting a maximum amplitude of the radial vibration from amplitudes obtained at all azimuths, and evaluating the radial vibration of the rotating body on the basis of the maximum amplitude.

23. The method of evaluating asynchronous radial vibration components called Non Repeatable Round Out of a rotating body according to claim 22, further comprising:

defining an azimuth exhibiting the maximum amplitude of the radial vibration as the maximum azimuth.

24. An apparatus for evaluating asynchronous radial vibration components called Non Repeatable Round Out of a rotating body, wherein the radial vibration of the rotating body is measured by use of a method for evaluating the radial vibration according to claim 22.

25. A rotation unit having a rotating body and a fixed member, wherein the fixed member has a marked portion at a position of the maximum azimuth or a minimum azimuth on the basis of evaluation in accordance with a method for evaluating asynchronous radial vibration components called Non Repeatable Round Out according to claim 23.

26. The rotation unit according to claim 25, wherein said rotation unit includes a rolling bearing or a spindle.

* * * * *